US009369943B2

(12) United States Patent
Li et al.

(10) Patent No.: US 9,369,943 B2
(45) Date of Patent: Jun. 14, 2016

(54) COGNITIVE COMMUNICATIONS

(75) Inventors: Junyi Li, Bedminster, NJ (US); Frank A. Lane, Asbury, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1109 days.

(21) Appl. No.: 11/621,993

(22) Filed: Jan. 10, 2007

(65) Prior Publication Data
US 2007/0213046 A1  Sep. 13, 2007

Related U.S. Application Data

(60) Provisional application No. 60/758,010, filed on Jan. 11, 2006, provisional application No. 60/758,011, filed on Jan. 11, 2006, provisional application No. 60/758,012, filed on Jan. 11, 2006, provisional application No. 60/845,052, filed on Sep. 15, 2006, provisional application No. 60/845,051, filed on Sep. 15, 2006, provisional application No. 60/863,304, filed on Oct. 27, 2006.

(51) Int. Cl.
*H04M 3/42* (2006.01)
*H04W 40/24* (2009.01)
(Continued)

(52) U.S. Cl.
CPC ........... *H04W 40/244* (2013.01); *H04L 5/0016* (2013.01); *H04L 5/0035* (2013.01); *H04L 27/261* (2013.01); *H04W 8/005* (2013.01); *H04W 16/14* (2013.01); *H04W 36/16* (2013.01); *H04W 48/20* (2013.01); *H04W 52/0229* (2013.01); *H04W 72/02* (2013.01); *H04W 88/10* (2013.01); *H04J 3/0602* (2013.01); *H04L 5/0048* (2013.01); *H04L 27/2601* (2013.01); *H04W 28/048* (2013.01); *H04W 28/18* (2013.01);
(Continued)

(58) Field of Classification Search
CPC .. H04W 36/14; H04W 36/0022; H04L 69/14; H04M 3/42263
USPC ............. 455/552.1, 553.1, 417; 370/331, 338
See application file for complete search history.

(56) References Cited

U.S. PATENT DOCUMENTS 2,972,743 A   2/1961   Svensson
5,216,693 A   6/1993   Nakamura
(Continued)

FOREIGN PATENT DOCUMENTS

CN          1310927 A       8/2001
CN          1327354 A       12/2001
(Continued)

OTHER PUBLICATIONS

International Search Report—PCT/US2007/060349, International Search Authority—European Patent Office—Sep. 5, 2007.
(Continued)

*Primary Examiner* — Mazda Sabouri
*Assistant Examiner* — Edward Zhang
(74) *Attorney, Agent, or Firm* — James K. O'Hare

(57) ABSTRACT

Devices, systems, or methods provide seamless transitioning of communication session(s) across a variety of resources (e.g., cellular telephone, car phones, voice over internet protocol (VOIP), WiFi, web-based communications, conventional analog phones, global positioning systems (GPS), numerous communications services providers, a variety of communications protocols, services, etc.) to exploit functionalities associated therewith and mitigate users' having to end a communication session, and initiate another session in order to utilize different set(s) of available resources.

68 Claims, 21 Drawing Sheets

(51) Int. Cl.
    *H04L 5/00* (2006.01)
    *H04W 8/00* (2009.01)
    *H04W 16/14* (2009.01)
    *H04W 36/16* (2009.01)
    *H04W 48/20* (2009.01)
    *H04W 52/02* (2009.01)
    *H04W 72/02* (2009.01)
    *H04W 88/10* (2009.01)
    *H04J 3/06* (2006.01)
    *H04L 27/26* (2006.01)
    *H04W 28/18* (2009.01)
    *H04W 36/24* (2009.01)
    *H04W 48/08* (2009.01)
    *H04W 48/16* (2009.01)
    *H04W 52/04* (2009.01)
    *H04W 84/04* (2009.01)
    *H04W 84/18* (2009.01)
    *H04W 88/02* (2009.01)
    *H04W 88/04* (2009.01)
    *H04W 88/06* (2009.01)
    *H04W 28/04* (2009.01)

(52) U.S. Cl.
    CPC .............. *H04W36/24* (2013.01); *H04W 40/24* (2013.01); *H04W 48/08* (2013.01); *H04W 48/16* (2013.01); *H04W 52/04* (2013.01); *H04W 84/042* (2013.01); *H04W 84/18* (2013.01); *H04W 88/02* (2013.01); *H04W 88/04* (2013.01); *H04W 88/06* (2013.01); *Y02B 60/50* (2013.01)

(56) References Cited

U.S. PATENT DOCUMENTS

| | | | |
|---|---|---|---|
| 5,233,627 A | | 8/1993 | Kozima et al. |
| 5,535,425 A | | 7/1996 | Watanabe |
| 5,583,870 A | | 12/1996 | Delprat et al. |
| 5,701,589 A | | 12/1997 | Lee et al. |
| 5,726,893 A | | 3/1998 | Schuchman et al. |
| 5,754,542 A | | 5/1998 | Ault et al. |
| 5,805,575 A | | 9/1998 | Kamin, Jr. |
| 5,818,871 A | | 10/1998 | Blakeney, II et al. |
| 5,839,074 A | | 11/1998 | Plehn |
| 5,844,900 A | | 12/1998 | Hong et al. |
| 5,852,780 A | | 12/1998 | Wang et al. |
| 5,903,618 A | | 5/1999 | Miyake |
| 5,940,765 A | | 8/1999 | Haartsen |
| 5,953,323 A | | 9/1999 | Haartsen |
| 5,991,639 A | * | 11/1999 | Rautiola et al. ............ 455/414.1 |
| 5,995,500 A | | 11/1999 | Ma |
| 5,995,844 A | | 11/1999 | Fukuda |
| 6,011,515 A | | 1/2000 | Radcliffe et al. |
| 6,011,978 A | | 1/2000 | Ault et al. |
| 6,047,178 A | | 4/2000 | Frlan |
| 6,175,747 B1 | | 1/2001 | Tanishima et al. |
| 6,230,012 B1 | | 5/2001 | Willkie et al. |
| 6,377,608 B1 | | 4/2002 | Zyren |
| 6,389,062 B1 | | 5/2002 | Wu |
| 6,473,418 B1 | | 10/2002 | Laroia et al. |
| 6,545,997 B1 | | 4/2003 | Bohnke et al. |
| 6,574,266 B1 | | 6/2003 | Haartsen |
| 6,580,981 B1 | | 6/2003 | Masood et al. |
| 6,609,010 B1 | | 8/2003 | Dolle et al. |
| 6,611,507 B1 | | 8/2003 | Hottinen et al. |
| 6,614,769 B1 | | 9/2003 | Erlick et al. |
| 6,650,629 B1 | | 11/2003 | Takahashi et al. |
| 6,671,525 B2 | | 12/2003 | Allen et al. |
| 6,725,058 B2 | | 4/2004 | Rinne et al. |
| 6,728,232 B2 | | 4/2004 | Hasty, Jr. et al. |
| 6,735,448 B1 | | 5/2004 | Krishnamurthy et al. |
| 6,741,836 B2 | | 5/2004 | Lee et al. |
| 6,744,743 B2 | | 6/2004 | Walton et al. |
| 6,760,599 B1 | | 7/2004 | Uhlik |
| 6,763,013 B2 | | 7/2004 | Kennedy |
| 6,771,706 B2 | | 8/2004 | Ling et al. |
| 6,771,963 B1 | | 8/2004 | Cheng et al. |
| 6,859,463 B1 | | 2/2005 | Mayor et al. |
| 6,882,632 B1 | | 4/2005 | Koo et al. |
| 6,882,851 B2 | | 4/2005 | Sugar et al. |
| 6,920,171 B2 | | 7/2005 | Souissi et al. |
| 6,922,388 B1 | | 7/2005 | Laroia et al. |
| 6,934,299 B2 | | 8/2005 | Kaatz |
| 6,940,827 B2 | | 9/2005 | Li et al. |
| 6,940,843 B2 | | 9/2005 | Goodall et al. |
| 6,961,364 B1 | | 11/2005 | Laroia et al. |
| 6,975,600 B1 | | 12/2005 | Vaughan et al. |
| 6,975,855 B1 | | 12/2005 | Wallenius |
| 6,982,987 B2 | | 1/2006 | Cain |
| 6,990,087 B2 | | 1/2006 | Rao et al. |
| 7,006,451 B2 | | 2/2006 | Kuwahara |
| 7,013,145 B1 | | 3/2006 | Centore, III |
| 7,016,649 B1 | | 3/2006 | Narasimhan et al. |
| 7,019,616 B2 | | 3/2006 | Fernandez |
| 7,027,409 B2 | | 4/2006 | Cain |
| 7,035,221 B2 | | 4/2006 | Furukawa et al. |
| 7,039,372 B1 | | 5/2006 | Sorrells et al. |
| 7,072,650 B2 | | 7/2006 | Stanforth |
| 7,092,391 B2 | | 8/2006 | Umeda |
| 7,130,368 B1 | | 10/2006 | Aweya et al. |
| 7,133,697 B2 | | 11/2006 | Judd et al. |
| 7,136,655 B2 | | 11/2006 | Skafidas et al. |
| 7,149,201 B2 | | 12/2006 | Hunzinger |
| 7,164,885 B2 | | 1/2007 | Jonsson et al. |
| 7,167,463 B2 | | 1/2007 | Alapuranen |
| 7,174,187 B1 | | 2/2007 | Ngan |
| 7,180,884 B2 | | 2/2007 | Elliott et al. |
| 7,218,689 B2 | | 5/2007 | Gupta |
| 7,224,954 B2 | | 5/2007 | Okajima et al. |
| 7,228,138 B2 | | 6/2007 | Hansson et al. |
| 7,233,602 B2 | | 6/2007 | Chen et al. |
| 7,246,235 B2 | | 7/2007 | Ellison et al. |
| 7,248,570 B2 | | 7/2007 | Bahl et al. |
| 7,260,399 B1 | * | 8/2007 | Oh et al. ........................ 455/436 |
| 7,269,169 B1 | | 9/2007 | Venkataraman et al. |
| 7,280,467 B2 | | 10/2007 | Smee et al. |
| 7,280,810 B2 | * | 10/2007 | Feher ............................ 455/137 |
| 7,313,628 B2 | | 12/2007 | Chaskar et al. |
| 7,333,829 B2 | | 2/2008 | Malone et al. |
| 7,336,626 B1 | | 2/2008 | Barratt et al. |
| 7,339,883 B2 | | 3/2008 | Santhoff et al. |
| 7,342,834 B2 | | 3/2008 | Ishibashi |
| 7,342,896 B2 | | 3/2008 | Ayyagari |
| 7,342,900 B2 | | 3/2008 | Xiong et al. |
| 7,352,733 B2 | | 4/2008 | Green |
| 7,366,200 B2 | | 4/2008 | Laroia et al. |
| 7,378,953 B2 | | 5/2008 | Coronel et al. |
| 7,388,845 B2 | | 6/2008 | Laroia et al. |
| 7,388,857 B2 | | 6/2008 | Sharma |
| 7,401,224 B2 | | 7/2008 | Gantman et al. |
| 7,426,396 B2 | | 9/2008 | Iwasaki et al. |
| 7,440,754 B2 | | 10/2008 | Bahl et al. |
| 7,457,646 B2 | | 11/2008 | Mahany et al. |
| 7,477,897 B2 | * | 1/2009 | Bye .............................. 455/436 |
| 7,493,149 B1 | | 2/2009 | Doyle et al. |
| 7,499,418 B2 | | 3/2009 | Oprescu-Surcobe et al. |
| 7,502,341 B2 | | 3/2009 | Matoba et al. |
| 7,512,096 B2 | | 3/2009 | Kuzminskiy et al. |
| 7,545,771 B2 | | 6/2009 | Wentink et al. |
| 7,548,758 B2 | | 6/2009 | Periyalwar et al. |
| 7,570,627 B2 | | 8/2009 | Welborn et al. |
| 7,570,969 B2 | | 8/2009 | Hwang et al. |
| 7,586,881 B2 | | 9/2009 | Hansen et al. |
| 7,590,183 B2 | | 9/2009 | Yonge, III et al. |
| 7,613,426 B2 | | 11/2009 | Kuehnel et al. |
| 7,626,975 B2 | | 12/2009 | Colban et al. |
| 7,653,011 B2 | | 1/2010 | Rahman et al. |
| 7,657,276 B2 | | 2/2010 | Sakoda |
| 7,664,055 B2 | | 2/2010 | Nelson |
| 7,664,130 B2 | | 2/2010 | Sakoda et al. |
| 7,715,790 B1 | * | 5/2010 | Kennedy ..................... 455/41.2 |
| 7,724,713 B2 | | 5/2010 | Del Prado Pavon et al. |
| 7,729,240 B1 | | 6/2010 | Crane et al. |

(56) References Cited

U.S. PATENT DOCUMENTS

| | | | |
|---|---|---|---|
| 7,756,521 B2 * | 7/2010 | Gerlach et al. | 455/450 |
| 7,925,010 B2 | 4/2011 | Sannino et al. | |
| 8,498,237 B2 | 7/2013 | Corson et al. | |
| 8,504,099 B2 | 8/2013 | Corson et al. | |
| 8,542,658 B2 | 9/2013 | Laroia et al. | |
| 8,553,644 B2 | 10/2013 | Laroia et al. | |
| 8,554,226 B2 | 10/2013 | Laroia et al. | |
| 2001/0055980 A1 | 12/2001 | Sato | |
| 2002/0105970 A1 | 8/2002 | Shvodian | |
| 2002/0128049 A1 * | 9/2002 | Davis | 455/572 |
| 2002/0131121 A1 | 9/2002 | Jeganathan et al. | |
| 2002/0131386 A1 | 9/2002 | Gwon | |
| 2002/0193945 A1 | 12/2002 | Tan et al. | |
| 2002/0196771 A1 * | 12/2002 | Vij et al. | 370/349 |
| 2002/0196844 A1 | 12/2002 | Rafie et al. | |
| 2003/0002482 A1 | 1/2003 | Kubler et al. | |
| 2003/0007473 A1 | 1/2003 | Strong et al. | |
| 2003/0012188 A1 | 1/2003 | Zelig et al. | |
| 2003/0054818 A1 | 3/2003 | Bahl | |
| 2003/0063655 A1 | 4/2003 | Young | |
| 2003/0069035 A1 | 4/2003 | Shurvinton | |
| 2003/0078031 A1 | 4/2003 | Masuda | |
| 2003/0078037 A1 * | 4/2003 | Auckland et al. | 455/422 |
| 2003/0108016 A1 | 6/2003 | Bonta | |
| 2003/0128659 A1 | 7/2003 | Hirsch | |
| 2003/0142631 A1 | 7/2003 | Silvester | |
| 2003/0145064 A1 | 7/2003 | Hsu et al. | |
| 2003/0169697 A1 | 9/2003 | Suzuki et al. | |
| 2003/0172362 A1 | 9/2003 | Mack-Crane et al. | |
| 2003/0174067 A1 | 9/2003 | Soliman | |
| 2003/0217266 A1 | 11/2003 | Epp et al. | |
| 2004/0005904 A1 | 1/2004 | Wolf et al. | |
| 2004/0008661 A1 | 1/2004 | Myles | |
| 2004/0009781 A1 | 1/2004 | Andrews et al. | |
| 2004/0028003 A1 | 2/2004 | Diener | |
| 2004/0032536 A1 | 2/2004 | Islam et al. | |
| 2004/0043782 A1 | 3/2004 | Gupta | |
| 2004/0047324 A1 | 3/2004 | Diener | |
| 2004/0057400 A1 | 3/2004 | Walsh et al. | |
| 2004/0063458 A1 | 4/2004 | Hori | |
| 2004/0064568 A1 | 4/2004 | Arora | |
| 2004/0067773 A1 | 4/2004 | Rachabathuni et al. | |
| 2004/0072558 A1 | 4/2004 | Van Bosch | |
| 2004/0077346 A1 | 4/2004 | Krenik et al. | |
| 2004/0077366 A1 | 4/2004 | Panasik et al. | |
| 2004/0081117 A1 | 4/2004 | Malek et al. | |
| 2004/0082326 A1 | 4/2004 | Shaw et al. | |
| 2004/0082356 A1 | 4/2004 | Walton et al. | |
| 2004/0090924 A1 | 5/2004 | Giaimo | |
| 2004/0095902 A1 | 5/2004 | Laroia et al. | |
| 2004/0095904 A1 | 5/2004 | Laroia et al. | |
| 2004/0106401 A1 | 6/2004 | Ormson | |
| 2004/0114521 A1 | 6/2004 | Sugaya | |
| 2004/0125776 A1 | 7/2004 | Haugli et al. | |
| 2004/0125778 A1 | 7/2004 | Lin et al. | |
| 2004/0127204 A1 | 7/2004 | Belmont | |
| 2004/0127214 A1 | 7/2004 | Reddy | |
| 2004/0127240 A1 | 7/2004 | Li | |
| 2004/0133689 A1 | 7/2004 | Vasisht | |
| 2004/0145604 A1 | 7/2004 | Min | |
| 2004/0147223 A1 | 7/2004 | Cho | |
| 2004/0152464 A1 | 8/2004 | Sugaya | |
| 2004/0162871 A1 | 8/2004 | Pabla et al. | |
| 2004/0165563 A1 | 8/2004 | Hsu et al. | |
| 2004/0176024 A1 * | 9/2004 | Hsu et al. | 455/3.04 |
| 2004/0176059 A1 | 9/2004 | Hayem et al. | |
| 2004/0190483 A1 | 9/2004 | Shahaf et al. | |
| 2004/0203762 A1 | 10/2004 | Liu et al. | |
| 2004/0204850 A1 | 10/2004 | MacNeille | |
| 2004/0218562 A1 * | 11/2004 | Orava et al. | 370/329 |
| 2004/0240401 A1 | 12/2004 | Willenegger et al. | |
| 2004/0240405 A1 | 12/2004 | Okazaki | |
| 2004/0240476 A1 | 12/2004 | Joshi | |
| 2004/0249448 A1 | 12/2004 | Gault | |
| 2004/0258006 A1 | 12/2004 | An | |
| 2004/0259529 A1 | 12/2004 | Suzuki | |
| 2005/0009578 A1 | 1/2005 | Liu | |
| 2005/0025092 A1 | 2/2005 | Morioka | |
| 2005/0037754 A1 | 2/2005 | Liu et al. | |
| 2005/0058102 A1 | 3/2005 | Santhoff et al. | |
| 2005/0058117 A1 | 3/2005 | Morioka et al. | |
| 2005/0058229 A1 | 3/2005 | Alagha | |
| 2005/0060535 A1 | 3/2005 | Bartas | |
| 2005/0063344 A1 | 3/2005 | Winzell | |
| 2005/0063416 A1 | 3/2005 | Shin et al. | |
| 2005/0068934 A1 | 3/2005 | Sakoda | |
| 2005/0075118 A1 | 4/2005 | Lewis et al. | |
| 2005/0085190 A1 | 4/2005 | Nishikawa | |
| 2005/0085214 A1 | 4/2005 | Laroia | |
| 2005/0088980 A1 | 4/2005 | Olkkonen et al. | |
| 2005/0090266 A1 | 4/2005 | Sheynblat | |
| 2005/0105491 A1 * | 5/2005 | Chaskar et al. | 370/331 |
| 2005/0111397 A1 | 5/2005 | Attar et al. | |
| 2005/0117525 A1 | 6/2005 | Poustchi | |
| 2005/0117530 A1 | 6/2005 | Abraham | |
| 2005/0128991 A1 | 6/2005 | Dayanandan et al. | |
| 2005/0129221 A1 | 6/2005 | Dickens et al. | |
| 2005/0135295 A1 | 6/2005 | Walton | |
| 2005/0143119 A1 | 6/2005 | Chandra et al. | |
| 2005/0152280 A1 | 7/2005 | Pollin et al. | |
| 2005/0153736 A1 | 7/2005 | Ganton | |
| 2005/0157660 A1 | 7/2005 | Mandato et al. | |
| 2005/0176371 A1 | 8/2005 | Palin et al. | |
| 2005/0177639 A1 | 8/2005 | Reunamaki | |
| 2005/0185628 A1 | 8/2005 | Watanabe et al. | |
| 2005/0185669 A1 | 8/2005 | Welborn et al. | |
| 2005/0191965 A1 | 9/2005 | Yu et al. | |
| 2005/0201308 A1 | 9/2005 | Sekiya et al. | |
| 2005/0210157 A1 | 9/2005 | Sakoda | |
| 2005/0220201 A1 | 10/2005 | Laroia et al. | |
| 2005/0226175 A1 | 10/2005 | Gupta | |
| 2005/0227692 A1 | 10/2005 | Kawashima et al. | |
| 2005/0227698 A1 | 10/2005 | Nonin et al. | |
| 2005/0233742 A1 | 10/2005 | Karaoguz et al. | |
| 2005/0233746 A1 | 10/2005 | Laroia et al. | |
| 2005/0238083 A1 | 10/2005 | Laroia et al. | |
| 2005/0250469 A1 | 11/2005 | Laroia et al. | |
| 2005/0254435 A1 * | 11/2005 | Moakley et al. | 370/252 |
| 2005/0265218 A1 | 12/2005 | Molisch et al. | |
| 2005/0265221 A1 | 12/2005 | Batra et al. | |
| 2005/0276243 A1 | 12/2005 | Sugaya et al. | |
| 2005/0281320 A1 | 12/2005 | Neugebauer | |
| 2005/0286477 A1 | 12/2005 | Gupta et al. | |
| 2006/0002332 A1 * | 1/2006 | Diaz Cervera et al. | 370/328 |
| 2006/0013160 A1 | 1/2006 | Haartsen | |
| 2006/0014542 A1 | 1/2006 | Khandekar et al. | |
| 2006/0019660 A1 | 1/2006 | Li | |
| 2006/0020556 A1 | 1/2006 | Hamnen | |
| 2006/0023668 A1 * | 2/2006 | Ramaswamy et al. | 370/335 |
| 2006/0023686 A1 | 2/2006 | Jeong et al. | |
| 2006/0025151 A1 | 2/2006 | Karaoguz et al. | |
| 2006/0031583 A1 | 2/2006 | Fujii et al. | |
| 2006/0034315 A1 | 2/2006 | Maekawa et al. | |
| 2006/0039332 A1 | 2/2006 | Kotzin | |
| 2006/0046728 A1 | 3/2006 | Jung et al. | |
| 2006/0058059 A1 | 3/2006 | Kim | |
| 2006/0058061 A1 * | 3/2006 | Nakagawa et al. | 455/553.1 |
| 2006/0073847 A1 | 4/2006 | Pirzada et al. | |
| 2006/0083199 A1 * | 4/2006 | Yang | 370/331 |
| 2006/0088010 A1 | 4/2006 | Buchwald et al. | |
| 2006/0089099 A1 | 4/2006 | Buchwald et al. | |
| 2006/0094456 A1 | 5/2006 | Rittle et al. | |
| 2006/0105741 A1 | 5/2006 | Suh et al. | |
| 2006/0111104 A1 | 5/2006 | Hyslop | |
| 2006/0114853 A1 | 6/2006 | Hasty, Jr. et al. | |
| 2006/0116113 A1 * | 6/2006 | Gass | 455/414.4 |
| 2006/0116877 A1 | 6/2006 | Pickering et al. | |
| 2006/0178131 A1 | 8/2006 | Huotari et al. | |
| 2006/0203789 A1 | 9/2006 | Iacono et al. | |
| 2006/0215611 A1 | 9/2006 | Nakagawa et al. | |
| 2006/0223511 A1 * | 10/2006 | Hagale et al. | 455/417 |
| 2006/0223574 A1 | 10/2006 | Chandra | |
| 2006/0233125 A1 | 10/2006 | Pajukoski et al. | |
| 2006/0251017 A1 | 11/2006 | Bishop | |

(56) References Cited

U.S. PATENT DOCUMENTS

| | | |
|---|---|---|
| 2006/0253736 A1 | 11/2006 | Rudolf et al. |
| 2007/0019717 A1 | 1/2007 | Laroia et al. |
| 2007/0054624 A1 | 3/2007 | Kashiwagi |
| 2007/0064742 A1 | 3/2007 | Shvodian |
| 2007/0066360 A1 | 3/2007 | Sato et al. |
| 2007/0070179 A1 | 3/2007 | Van Rooyen |
| 2007/0086424 A1 | 4/2007 | Calcev et al. |
| 2007/0097922 A1 | 5/2007 | Parekh et al. |
| 2007/0100222 A1 | 5/2007 | Mastrototaro et al. |
| 2007/0104138 A1 | 5/2007 | Rudolf et al. |
| 2007/0111734 A1 | 5/2007 | Beppu et al. |
| 2007/0136459 A1* | 6/2007 | Roche et al. ............... 709/224 |
| 2007/0142084 A1 | 6/2007 | Van Niekerk et al. |
| 2007/0153729 A1 | 7/2007 | Alapuranen |
| 2007/0160016 A1 | 7/2007 | Jain |
| 2007/0165589 A1 | 7/2007 | Sakoda |
| 2007/0201423 A1 | 8/2007 | Laroia et al. |
| 2007/0206554 A1 | 9/2007 | Laroia et al. |
| 2007/0211677 A1 | 9/2007 | Laroia et al. |
| 2007/0211678 A1 | 9/2007 | Li et al. |
| 2007/0211679 A1 | 9/2007 | Laroia et al. |
| 2007/0211680 A1 | 9/2007 | Laroia et al. |
| 2007/0247365 A1 | 10/2007 | Laroia et al. |
| 2007/0254596 A1 | 11/2007 | Corson et al. |
| 2007/0255960 A1 | 11/2007 | Hon et al. |
| 2007/0270190 A1 | 11/2007 | Hisky et al. |
| 2007/0274275 A1 | 11/2007 | Laroia et al. |
| 2007/0274276 A1 | 11/2007 | Laroia et al. |
| 2007/0286111 A1 | 12/2007 | Corson et al. |
| 2007/0291714 A1 | 12/2007 | Laroia et al. |
| 2007/0291715 A1 | 12/2007 | Laroia et al. |
| 2008/0002647 A1 | 1/2008 | Laroia et al. |
| 2008/0002648 A1 | 1/2008 | Laroia et al. |
| 2008/0013519 A1 | 1/2008 | Kwon et al. |
| 2008/0031193 A1 | 2/2008 | Laroia et al. |
| 2008/0037487 A1 | 2/2008 | Li et al. |
| 2008/0039066 A1 | 2/2008 | Laroia et al. |
| 2008/0043656 A1 | 2/2008 | Yoon et al. |
| 2008/0069072 A1 | 3/2008 | Callaway et al. |
| 2008/0075033 A1 | 3/2008 | Shattil |
| 2008/0112334 A1 | 5/2008 | Laroia et al. |
| 2008/0123600 A1 | 5/2008 | Fodor |
| 2008/0212651 A1 | 9/2008 | Santhoff et al. |
| 2008/0212771 A1 | 9/2008 | Hauser |
| 2008/0318612 A1 | 12/2008 | Axnas et al. |
| 2009/0017858 A1 | 1/2009 | Kwon et al. |
| 2009/0040996 A1 | 2/2009 | Laroia et al. |
| 2009/0059841 A1 | 3/2009 | Laroia et al. |
| 2009/0092075 A1 | 4/2009 | Corson et al. |
| 2009/0190558 A1 | 7/2009 | Strutt et al. |
| 2009/0282253 A1 | 11/2009 | Rose et al. |
| 2009/0296669 A1 | 12/2009 | Uchiyama et al. |
| 2010/0128652 A1 | 5/2010 | Lee et al. |
| 2013/0343283 A1 | 12/2013 | Laroia |
| 2015/0063213 A1 | 3/2015 | Laroia et al. |

FOREIGN PATENT DOCUMENTS

| | | |
|---|---|---|
| CN | 1371583 A | 9/2002 |
| CN | 1397117 A | 2/2003 |
| CN | 1411237 | 4/2003 |
| CN | 1578314 A | 2/2005 |
| CN | 1596005 A | 3/2005 |
| CN | 1650594 A | 8/2005 |
| CN | 1663156 | 8/2005 |
| CN | 1689345 A | 10/2005 |
| CN | 1909386 A | 2/2007 |
| EP | 0469659 A1 | 2/1992 |
| EP | 0776134 A2 | 5/1997 |
| EP | 0848567 A1 | 6/1998 |
| EP | 0969602 A1 | 1/2000 |
| EP | 1089586 A1 | 4/2001 |
| EP | 1119137 A1 | 7/2001 |
| EP | 1241838 A2 | 9/2002 |
| EP | 1326386 A1 | 7/2003 |
| EP | 1408651 A1 | 4/2004 |
| EP | 1469659 A1 | 10/2004 |
| EP | 1496668 | 1/2005 |
| EP | 1549094 A1 | 6/2005 |
| EP | 1562333 | 8/2005 |
| EP | 1566944 | 8/2005 |
| EP | 1592176 | 11/2005 |
| EP | 1670183 A1 | 6/2006 |
| EP | 1895714 A1 | 3/2008 |
| EP | 2312885 A1 | 4/2011 |
| GB | 232251 A1 | 3/1926 |
| GB | 2375014 A1 | 10/2002 |
| GB | 2410653 A | 8/2005 |
| JP | 7023465 | 1/1995 |
| JP | 07143567 | 6/1995 |
| JP | 8307934 A | 11/1996 |
| JP | 9107583 | 4/1997 |
| JP | 10013324 | 1/1998 |
| JP | 11289583 A | 10/1999 |
| JP | 11355291 | 12/1999 |
| JP | 2001069060 A | 3/2001 |
| JP | 2001069557 A | 3/2001 |
| JP | 2001118191 A | 4/2001 |
| JP | 2001257657 | 9/2001 |
| JP | 2001358694 A | 12/2001 |
| JP | 2002502164 A | 1/2002 |
| JP | 2002112347 | 4/2002 |
| JP | 2002208891 A | 7/2002 |
| JP | 2002223470 | 8/2002 |
| JP | 2002232337 A | 8/2002 |
| JP | 2002325281 A | 11/2002 |
| JP | 2002344458 A | 11/2002 |
| JP | 2003503920 A | 1/2003 |
| JP | 2003143644 A | 5/2003 |
| JP | 2003158525 A | 5/2003 |
| JP | 2003249939 A | 9/2003 |
| JP | 2003258703 A | 9/2003 |
| JP | 2003348636 A | 12/2003 |
| JP | 2004032462 A | 1/2004 |
| JP | 2004053510 A | 2/2004 |
| JP | 2004128785 A | 4/2004 |
| JP | 2004146883 A | 5/2004 |
| JP | 2004147015 A | 5/2004 |
| JP | 2004180297 A | 6/2004 |
| JP | 2004242187 A | 8/2004 |
| JP | 2004247820 A | 9/2004 |
| JP | 2004254254 A | 9/2004 |
| JP | 2004260258 A | 9/2004 |
| JP | 2004260748 A | 9/2004 |
| JP | 2004336351 A | 11/2004 |
| JP | 2004533762 A | 11/2004 |
| JP | 2004349777 A | 12/2004 |
| JP | 2004350168 A | 12/2004 |
| JP | 2004363877 A | 12/2004 |
| JP | 2005033808 A | 2/2005 |
| JP | 2005045368 | 2/2005 |
| JP | 2005065101 A | 3/2005 |
| JP | 2005072910 A | 3/2005 |
| JP | 2005086234 A | 3/2005 |
| JP | 2005086408 | 3/2005 |
| JP | 2005124121 A | 5/2005 |
| JP | 2005136529 A | 5/2005 |
| JP | 2005151525 A | 6/2005 |
| JP | 2005167502 A | 6/2005 |
| JP | 2005210703 A | 8/2005 |
| JP | 2005223722 A | 8/2005 |
| JP | 2005223767 A | 8/2005 |
| JP | 2005523616 A | 8/2005 |
| JP | 2005236819 A | 9/2005 |
| JP | 2005244698 A | 9/2005 |
| JP | 2005252645 A | 9/2005 |
| JP | 2005253038 A | 9/2005 |
| JP | 2005253047 A | 9/2005 |
| JP | 2005277599 A | 10/2005 |
| JP | 2005277815 A | 10/2005 |
| JP | 2005295400 | 10/2005 |
| JP | 2005328231 | 11/2005 |
| JP | 2005341592 A | 12/2005 |

(56) References Cited

FOREIGN PATENT DOCUMENTS

| | | |
|---|---|---|
| JP | 2005348203 | 12/2005 |
| JP | 2005354326 A | 12/2005 |
| JP | 2005537762 T | 12/2005 |
| JP | 2006005792 A | 1/2006 |
| JP | 2006501777 A | 1/2006 |
| JP | 2007509531 | 4/2007 |
| JP | 2007525891 A | 9/2007 |
| JP | 2007533256 | 11/2007 |
| JP | 2008507219 T | 3/2008 |
| JP | 2008228128 A | 9/2008 |
| KR | 960012088 B1 | 9/1996 |
| KR | 100225765 B1 | 10/1999 |
| KR | 20000035806 A | 6/2000 |
| KR | 10362135 | 11/2002 |
| KR | 20030024435 A | 3/2003 |
| TW | 540210 | 7/2003 |
| TW | 545006 B | 8/2003 |
| TW | I239782 | 9/2005 |
| TW | M286515 | 1/2006 |
| TW | I250742 | 3/2006 |
| TW | M292848 | 6/2006 |
| WO | WO9701256 | 1/1997 |
| WO | WO9749258 | 12/1997 |
| WO | WO9808321 | 2/1998 |
| WO | WO0074429 | 12/2000 |
| WO | WO0101717 A1 | 1/2001 |
| WO | 0192992 A2 | 12/2001 |
| WO | 0223758 | 3/2002 |
| WO | WO0249387 A1 | 6/2002 |
| WO | 02078271 A1 | 10/2002 |
| WO | 02082742 A1 | 10/2002 |
| WO | 02091623 A1 | 11/2002 |
| WO | WO03001742 | 1/2003 |
| WO | 03039054 | 5/2003 |
| WO | WO-03039064 A1 | 5/2003 |
| WO | WO03090037 A2 | 10/2003 |
| WO | 2004012464 A2 | 2/2004 |
| WO | 2004019529 A2 | 3/2004 |
| WO | WO2004023241 A2 | 3/2004 |
| WO | 2004032536 A2 | 4/2004 |
| WO | WO2004047348 A1 | 6/2004 |
| WO | WO2004066646 A1 | 8/2004 |
| WO | WO2004071022 A1 | 8/2004 |
| WO | 2004080103 A1 | 9/2004 |
| WO | WO2004077920 A2 | 9/2004 |
| WO | WO2005013529 | 2/2005 |
| WO | 2005022846 A1 | 3/2005 |
| WO | WO2005020517 | 3/2005 |
| WO | WO2005027556 A1 | 3/2005 |
| WO | 2005038606 A2 | 4/2005 |
| WO | 2005039105 A1 | 4/2005 |
| WO | WO2005034433 A1 | 4/2005 |
| WO | WO2005039128 | 4/2005 |
| WO | 2005053346 A1 | 6/2005 |
| WO | 2005053347 A1 | 6/2005 |
| WO | WO2005053253 | 6/2005 |
| WO | WO2005055527 | 6/2005 |
| WO | WO2005060209 A1 | 6/2005 |
| WO | WO2005062552 A1 | 7/2005 |
| WO | 2005071998 A1 | 8/2005 |
| WO | 2005076543 A1 | 8/2005 |
| WO | WO2005079012 A1 | 8/2005 |
| WO | 2005109657 A1 | 11/2005 |
| WO | WO2005109916 | 11/2005 |
| WO | WO2005109917 A1 | 11/2005 |
| WO | 2005117463 A1 | 12/2005 |
| WO | WO2005119478 | 12/2005 |
| WO | 2006000617 A1 | 1/2006 |
| WO | 2006007946 A1 | 1/2006 |
| WO | WO-2006006138 A1 | 1/2006 |
| WO | WO2006057815 | 6/2006 |
| WO | WO2006138122 A2 | 12/2006 |
| WO | 2007038896 A2 | 4/2007 |
| WO | WO2008014336 A2 | 1/2008 |
| WO | 2008020162 A2 | 2/2008 |
| WO | 2008072346 A1 | 6/2008 |

OTHER PUBLICATIONS

Written Opinion—PCT/US2007/060349, International Search Authority—European Patent Office—Sep. 5, 2007.
International Preliminary Report on Patentability—PCT/US2007/060349, International Search Authority—The International Bureau of WIPO—Geneva, Switzerland—Jul. 15, 2008.
Yanchao Zhang, Wei Liu, Wenjing Lou, Yuguang Fang; Anonymous Handshakes in Mobile Ad hoc Networks; MILCOM 2004—2004 IEEE Military Communications Conference; pp. 1193-1199; XP-002432989.
Hung-Yu Wei, Richard D. Gitlin; Incentive Scheduling for Cooperative Relay in WWAN/WLAN Two-Hop-Relay Network; IEEE Communications Society/ WCNC 2005; pp. 1696-1701.
Niels Hoven, Anant Sahai; Power Scaling for Cognitive Radio; 2005 International Conference on Wireless Networks, Communications and Mobile Computing; pp. 250-255.
Jose Costa-Requena, Raimo Kantola, Nicklas Beijar; Incentive.
Carlos Cordeiro, Kiran Challapali, Dagnachew Birru, Sai Shankar; IEEE 802.22: The First Worldwide Wireless Standard Based on Cognitive Radios; 2005 IEEE ; pp. 328-337: XP-10855130A.
Cabric D et al: "Implementation Issues in Spectrum Sensing for Cognitive Radios" Signals, Systems and Computers, 2004. Conference Record of the Thirty-Eighth ASILOMAR Conference on Pacific Grove, CA Nov. 7-10, 2004 pp. 772-776 XP-010781056.
Ylianttila et al: "Geolocation Information and Inter-Technology Handoff" ICC 2000. 2000 IEEE International Conference on Communications. Conference Record. New Orleans, LA, Jun. 18-22, 2000, pp. 1573-1577,—XP-001208676.
Spyridon Panagiotakis et al: "Intelligent Service Mediation for Supporting Advanced Location and Mobility—Aware Service Provisioning in Reconfigurable Mobile Networks" IEEE Personal Communications, Oct. 2002 pp. 28-38, XP-011093874.
Dagres et al., "Flexible Radio: A General Framework With PHY-Layer Algorithm-Design Insights" EUROCON 2005, Nov. 22-24, 2005 pp. 120-123, XP-10916036.
Van De Beek, "ML Estimation of Time and Frequency Offset in OFDM Systems" IEEE Transactions on Signal Processing, vol. 45 No. 7 Jul. 1997, XP-11057861.
Brandes S et al: "Reduction of Out-of-Band Radiation in OFDM Based Overlay Systems" New Frontiers in Dynamic Spectrum Access Networks, 2005. DYSPAN 2005. 2005 First IEEE International Symposium on Baltimore, MD, USA Nov. 8-11, 2005, Piscataway, NJ, USA,IEEE, (Nov. 8, 2005), pp. 662-665, XP010855171 ISBN: 1-4244-0013-9.
Costa-Requena J et al: "Incentive Problem for Ad Hoc Networks Scalability" Autonomic and Autonomous Systems and International Conference on Networking and Services, 2005. ICAS-ICNS 2005. Joint International Conference on Papette, Tahiti Oct. 23-28, 2005, Piscataway, NJ, USA, IEEE, Oct. 23, 2005, pp. 70-70, XP010864809.
European Search Report—EP10187769 ,Search Authority—Munich Patent Office, Dec. 2, 2010.
Juels, A. et al.: "Client Puzzles: A Cryptographic Countermeasure Against Connection Depletion Attacks" Proceedings of NDSS. Networks and Distributed Security Systems, XX, XX, Feb. 3, 1999, pp. 151-165, XP002340691 paragraph [0001] paragraph [0003].
Taiwanese Search report—096101180—TIPO—Sep. 3, 2010.
Translation of Office Action in Korean application 2008-7019606 corresponding to U.S. Appl. No. 11/621,967, citing GB2375014 and US20050025092 dated Feb. 23, 2011.
Waters, B. et al.: "New Client Puzzle Outsourcing Techniques for DoS Resistance" CCS'04, Oct. 29, 2004, pp. 1-11, XP002538930 Washington, DC, USA abstract paragraph [01.2].
IEEE Computer Society, Part 15.4: Wireless Medium Access Control (MAC) and Physical Layer (PHY) Specifications for Low-Rate Wireless Personal Area Network (LRWPANs), IEEE Std 802. 15.4

(56) References Cited

OTHER PUBLICATIONS (TM)—2003, The United States of America, IEEE, Oct. 1, 2003, pp. 13 to 21, 45 to 47, 111 to 120, and 147 to 153.

IEEE Computer Society, Part 15.3: Wireless Medium Access Control (MAC) and Physical Layer (PHY) Specifications for High Rate Wireless Personal Area Networks (WPANs), IEEE Std 802. 15. 3 (TM)—2003, The United States of America, IEEE, Sep. 29, 2003, pp. 164 and 165.

IEEE, Part 15.3: Wireless Medium Access Control (MAC) and Physical Layer (PHY) Specifications for High Rate Wireless Personal Area Networks (WPANs), 802.15.3, The United States of America, IEEE, Sep. 29, 2003, IEEE Std 802. 15. Mar. 2003, pp. 8 to 16, 108 to 111,116 to 117, 170 to 171,and 204 to206.

Taiwan Search Report—TW096101104—TIPO—Jan. 27, 2011.

Wada, Y. et al., "Consideration of OFDM Cellular System Using Single Band", IEICE Year 2002 Communication Society Convention Lecture Papers 1, Aug. 20, 2002, p. 355, B-5-58.

Feng W et al., "Design and implementation of network puzzles", INFOCOM 2005 Proceedings IEEE 24th Annual Joint Conference of the IEEE Computer and Communications Societies Mar. 2005, pp. 2372-2382, vol. 4.

Hlavacs H., et al., "Enhancing ZRTP by using Computational Puzzles", Journal of Universal Computer Science, Feb. 28, 2008, vol. 14 No. 5, pp. 693-716.

Kim S., et al., "Reliable transfer on wireless sensor networks", IEEE SECON 2004—IEEE, 2004, pp. 449-459.

Taiwan Search Report—TW96101128—TIPO—Feb. 19, 2012.

* cited by examiner

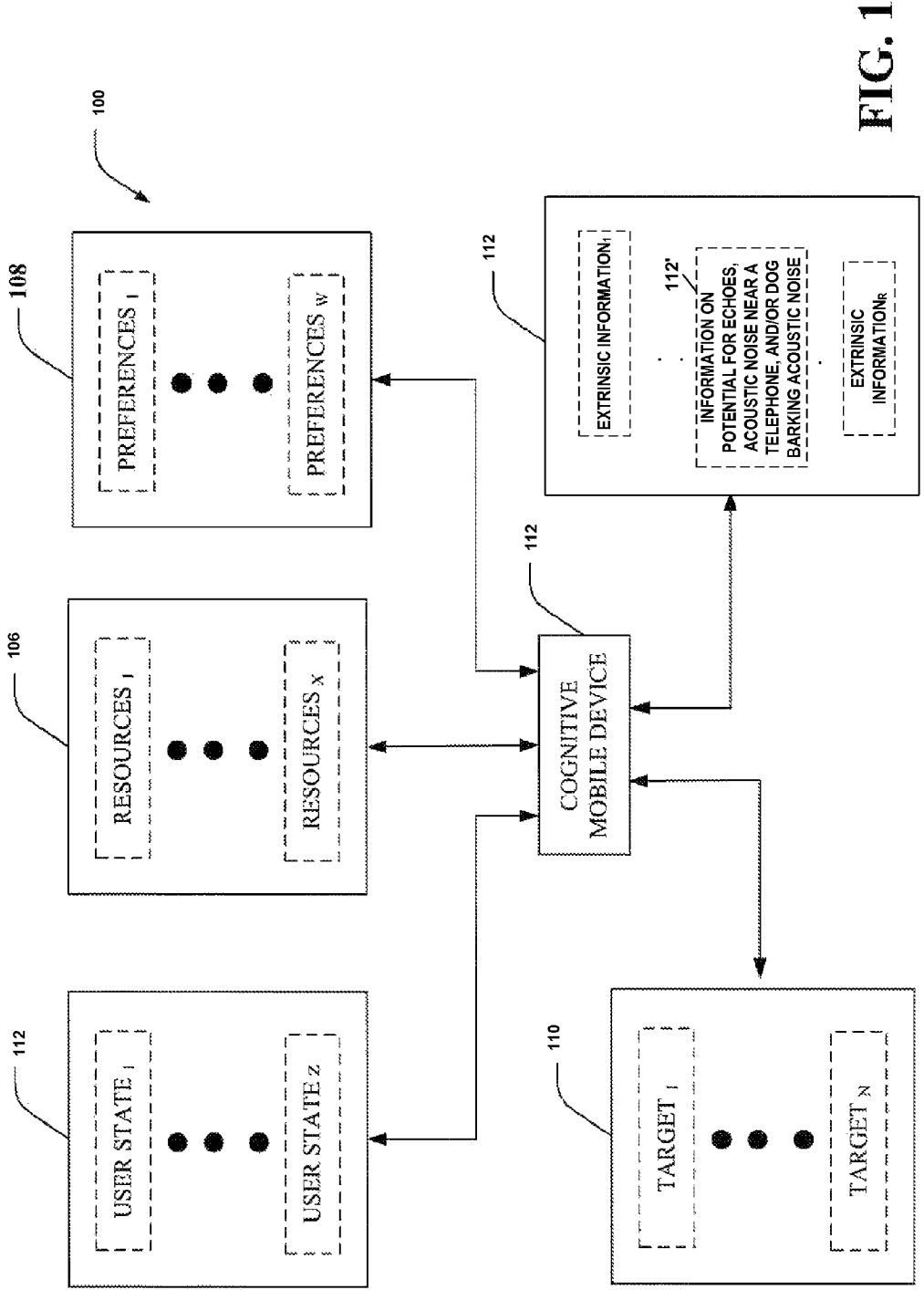

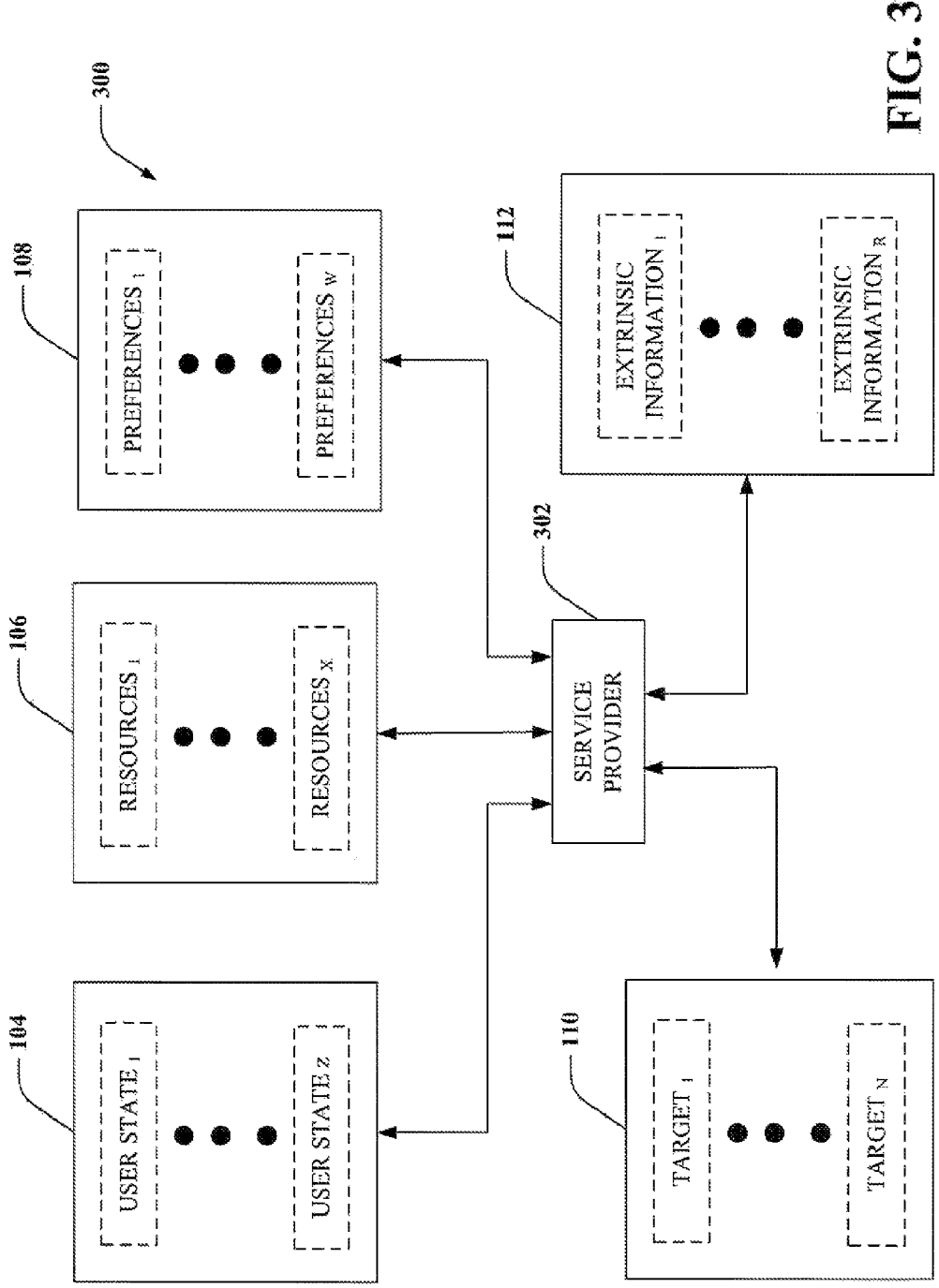

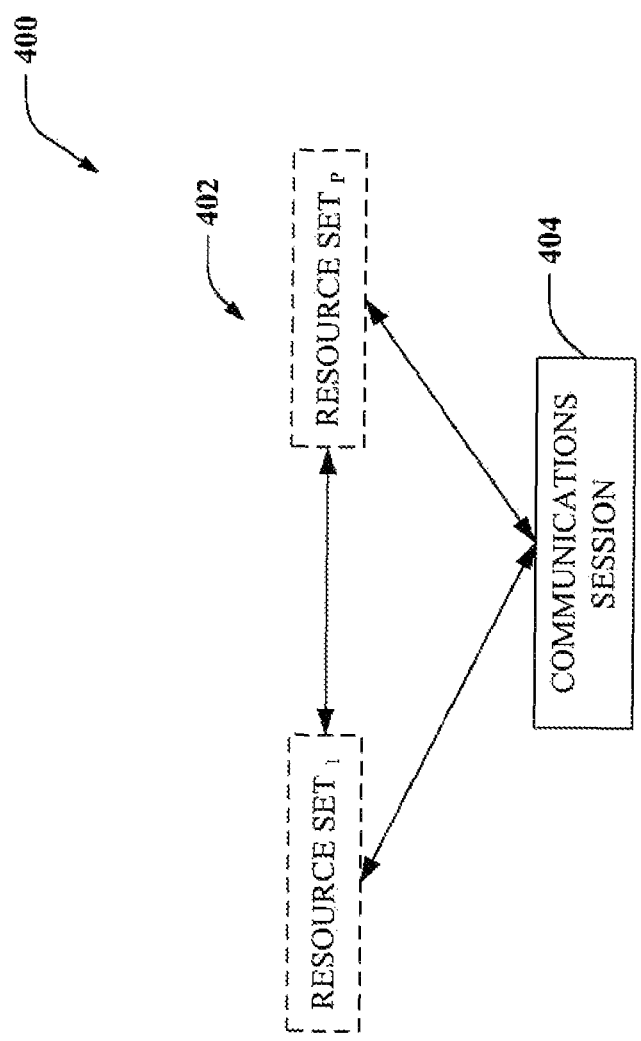

COGNITIVE COMMUNICATIONS

CROSS-REFERENCE TO RELATED APPLICATIONS

This application claims the benefit of U.S. Provisional Patent application Ser. No. 60/758,010 entitled "METHODS AND APPARATUS FOR FACILITATING IDENTIFICATION, SYNCHRONIZATION OR ACQUISITION USING BEACON SIGNALS" which was filed Jan. 11, 2006; U.S. Provisional Patent application Ser. No. 60/758,011 entitled "METHODS AND APPARATUS FOR USING BEACON SIGNALS FOR IDENTIFICATION, SYNCHRONIZATION OR ACQUISITION IN AN AD HOC WIRELESS NETWORK" which was filed Jan. 11, 2006; U.S. Provisional Patent application Ser. No. 60/758,012 entitled "METHODS AND APPARATUS FOR USING BEACON SIGNALS IN A COGNITIVE RADIO NETWORK" which was filed Jan. 11, 2006; U.S. Provisional Patent application Ser. No. 60/845,052 entitled "POWER ALLOCATION SCHEME" which was filed Sep. 15, 2006; U.S. Provisional Patent application Ser. No. 60/845,051 entitled "BEACONS IN A MIXED WIRELESS COMMUNICATION SYSTEM" which was filed Sep. 15, 2006; and U.S. Provisional Patent application Ser. No. 60/863,304 entitled "BEACONS IN A MIXED COMMUNICATION SYSTEM" which was filed Oct. 27, 2006. The entireties of the aforementioned applications are wherein: incorporated by reference.

BACKGROUND

I. Field

The following description relates generally to wireless communications, and more particularly to cognitive communications that provide for seamless transitioning of communications, across a plurality of devices, services, an platforms.

II. Background

Wireless communication systems have become a prevalent means by which a majority of people worldwide have come to communicate. Wireless communication devices have become smaller and more powerful in order to meet consumer needs, improve portability and convenience. The increase in processing power in mobile devices such as cellular telephones has lead to an increase in demands on wireless network transmission systems.

A typical wireless communication network (e.g., employing frequency, time, and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal.

Additionally, numerous device types, services and architectures (e.g., cellular telephone, car phones, voice over internet protocol (VOIP), WiFi, web-based communications, conventional analog phones, global positioning systems (GPS), numerous communications services providers, a variety of communications protocols, etc.) are available to consumers, and oftentimes require users to employ a subset of these device types, services, and architectures to fully exploit the functionalities associated therewith. However, maintaining such multitude of devices and services can be frustrating to users and inconvenient especially when attempting to switch there among.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with various aspects, seamless transitioning of communication session(s) across a variety of resources (e.g., cellular telephone, car phones, voice over internet protocol (VOIP), WiFi, web-based communications, conventional analog phones, global positioning systems (GPS), numerous communications services providers, a variety of communications protocols, services, etc.) is provided to exploit functionalities associated therewith and mitigate users' having to end a communication session, and initiate another session in order to utilize different set(s) of available resources.

In accordance with an aspect, a method of wireless data transmission comprises determining current or inferring future state of user equipment in connection with a communication session; sensing available resources; and transitioning the communication session from a first set of resources to a second set of resources as a function of the determined or inferred user equipment state. In the scenario in which a plurality of resources have been detected to be available in the above sensing step, the method further comprises comparing the detected resources, and selecting to use one of the detected resources for the communication session or transitioning the communication session from a first set of resources to a second set of resource as a function of the result of the above comparison. The comparison can be done based on a cost-benefit analysis, in which the cost can be measured by the power and bandwidth required for the communication session as well as the cost of using the spectrum, which can be determined by signal quality, interference level, traffic congestion level, and service policy, and the benefit can be measured by the service quality of the communication session, such as data rate, latency, reliability, etc.

In accordance with another aspect, a method of wireless data transmission, comprises establishing a first communication session using a first set of resource, determining the time periods in which the first communication session is in a temporary suspended mode, establishing or attempting to establish a second communication session using a second set of resource in the time periods of the suspended mode, and returning to the first communication session in other time periods.

In another aspect, an apparatus that facilitates wireless data transmission comprises a resource sensing component that senses available resources to facilitate a communication session; a processing component that executes computer-based instructions to determine or infer state of a user; and a transitioning component that transitions the communication session from a first set of available resources to a second set of available resources as a function of the determined or inferred user state.

According to yet another aspect, an apparatus for wireless data transmission, comprises means for determining resource availability; and means for transitioning a communication from a first set of resources to a second set of resources as a function of the determined resource availability.

In accordance with an aspect, a computer-readable medium has stored thereon computer-executable instructions for: determining current or inferring future state of user equipment in connection with a communication session; sensing available resources; and transitioning the communication session from a first set of resources to a second of resources as a function of the determined or inferred user equipment state.

In an aspect, a processor that executes instructions to facilitate wireless communications has instructions comprising: determining current or inferring future state of user equipment in connection with a communication session; sensing available resources; and transitioning the communication session from a first set of resources to a second of resources as a function of the determined or inferred user equipment state.

In yet another aspect, a method of wireless data transmission provided by a communication service provider, comprises: monitoring state of a user or user equipment; sensing available communications resources; and transitioning a communication session from a licensed communications band to an unlicensed communications band as a function of the user or user equipment.

According to another aspect, a method of wireless data transmission provided by a communications service provider comprises: monitoring state of a user or user equipment; sensing available communications resources; and transitioning a communication session from an un-licensed communications band to a licensed communications bland as a function of the user or user equipment.

Another aspect relates to a method of wireless data transmission provided by a communications service provider, comprising: monitoring state of a user or user equipment; sensing available communications resources; and transitioning a communication session from a first communications band to a second communications band as a function of the user or user equipment.

Yet another aspect relates to a method, comprising: sensing distance to a device; and switching a communication session to a second set of resources when the distance to the device exceeds a threshold.

Still yet another aspect relates to a processor that executes the following instructions, comprising: sensing distance to a device or poser level associated with a communication with the device; and switching a communication session to a second set of resources when the distance to the device or power level can lead to degradation of quality of service associated with the communication session.

Another aspect relates to a system, comprising: means for sensing distance to a user equipment; and means for switching a communication session to a second set of resources when the distance to the user equipment exceeds a threshold.

An aspect relates to a method, comprising: sensing power level associated a received transmission from a device and switching a communication session to a second set of resources when the power level crosses a threshold.

Still another aspect relates to a method of wireless data transmission provided by a communications service provider, comprising: monitoring state of a user or user equipment; sensing available communications resources; and transitioning a communication session from a first set of communications resources to a second set of communications resources as a function of the user or user equipment state, wherein employment of the second set of resources comprises concurrently employing a licensed communications band and an unlicensed communications band.

An aspect provides for a method of wireless data transmission, comprising: determining current or inferring future state of user equipment in connection with a first communication session; sensing available resources; and establishing a concurrent second communication session using a different set of resources from the first communication session.

Yet still another aspect relates to a processor that executes instructions to facilitate wireless communications, the instructions comprising: establishing a second communication session concurrent to a first communication session using a same device, wherein the second communication session employs a set of resources different from the first communication session, and the second communication session compensates for the first communication session.

Another aspect relates to a computer-readable medium having stored thereon computer-executable instructions for: establishing a second communication session concurrent to a first communication session using a same device, wherein the second communication session employs a set of resources different from the first communication session, and the second communication session compensates for the first communication session.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

FIG. 1 illustrates a cognitive communications system in accordance with one or more aspects described herein.

FIG. 3 illustrates a cognitive communications system in accordance with one or more aspects described herein.

FIG. 4 illustrates a cognitive communications system in accordance with one or more aspects described herein.

DETAILED DESCRIPTION

Figure 2A:
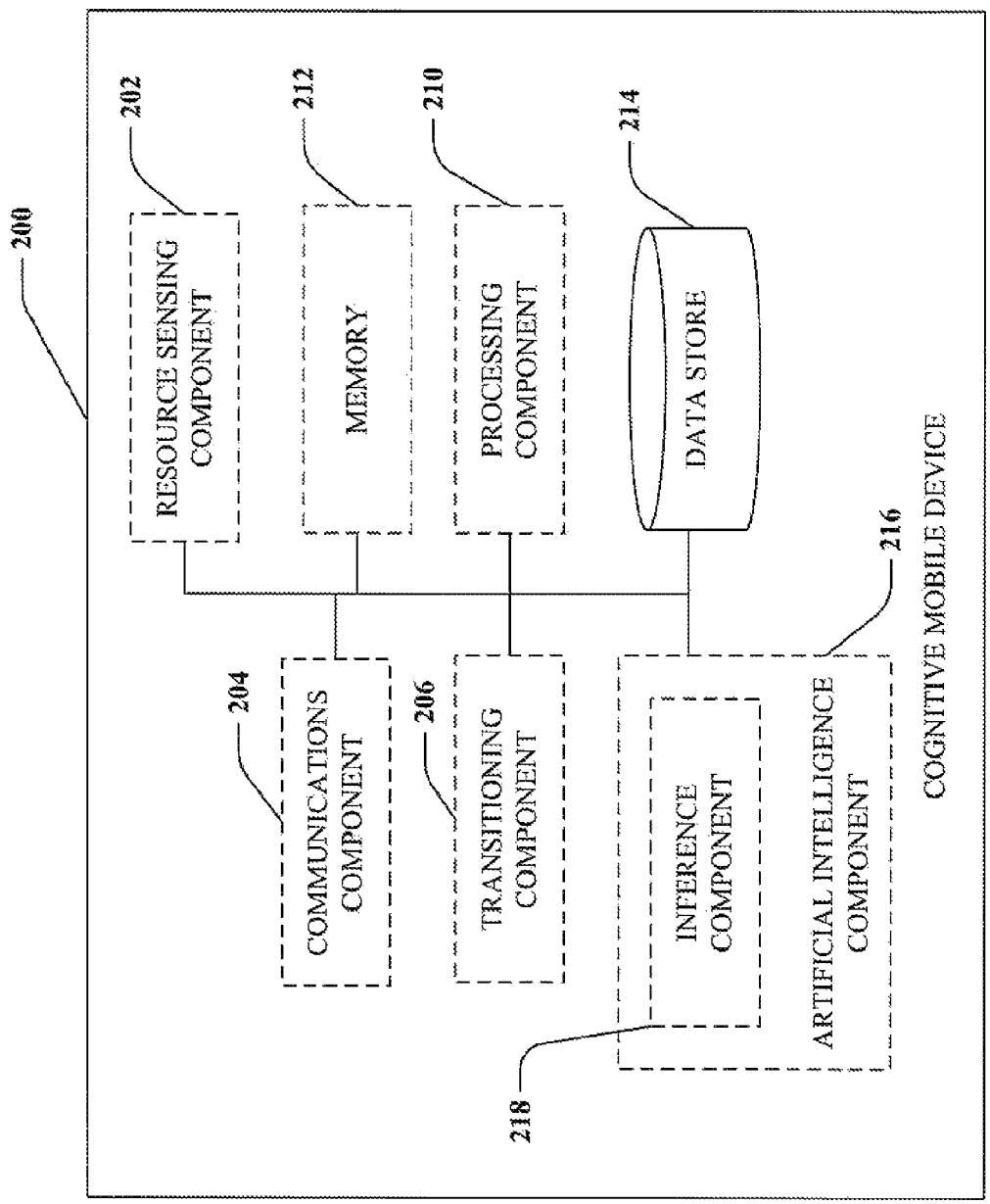
FIG. 2a is an illustration of a cognitive mobile device in accordance with one or more aspects described herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Various aspects can incorporate inference schemes and/or techniques in collection with transitioning communication sessions. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events, or decision theoretic, building upon probabilistic inference, and considering display actions of highest expected utility, in the context of uncertainty in user goals and intentions. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, various aspects are described herein in connection with a subscriber station. A subscriber station can also be called a system, a subscriber unit, mobile station, mobile, remote station, access point, remote terminal, access terminal, user terminal, user agent, a user device, mobile device, portable communications device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any aspect or design described herein as "exemplary" is not necessarily to be construed as preferred or advantageous over other aspects or designs.

Unique systems, methods, and devices will be described herein that facilitate seamless transitioning of communication session(s) across a variety of device types, services and architectures (e.g., cellular telephones, car phones, voice over internet protocol (VOIP), WiFi, web-based communications, conventional analog phones, global positioning systems (GPS), numerous communications services providers, a variety of communications protocols, etc.) to provide for exploiting functionalities associated therewith and mitigate users' having to end a communication session, and initiate another session in order to utilize different set(s) of available resources.

Referring now to FIG. 1, a cognitive wireless network communication system 100 is illustrated in accordance with various aspects presented herein. System 100 can comprise a plurality of nodes, such as one or more base stations 102 (e.g., cellular, WiFi or ad hoc, . . . ) in one or more sectors that receive, transmit, repeat, etc. wireless communication signals to each other and/or to one or more other nodes, such as mobile devices. Those nodes are usually powered by battery power source; however, any suitable power source can be employed. System 100 facilitates transitioning communications between devices, platforms, services, and protocols, for example. More particularly, system 100 provides for transitioning/migrating a communication from a first communications state to another communications state. A communications state, for example, can include type of communications device, type of service, location of user, licensed communications band versus unlicensed communications band, protocols, etc. Oftentimes, a user's communications state is in relative transition as a function of a variety of extrinsic factors (e.g., current location, communications device employed, communication modality employed, fidelity of communications, party in communication with, priority of communications, movement, available resources, preferences, etc.), and as the communication state transitions from one state to another a need may arise to conform or transition a current communications session (e.g., to another set of resources) in order to optimize the session.

For example, while a user is driving home he may employ a cellular phone built into his automobile that is utilizing a licensed communications band (e.g., through a cellular service provider). The automobile or his cellular phone may have global positioning system (GPS) service and track his movement while in the car. As he approaches home (the location determined by the GPS system), once he leaves his car, system 100 can transition the communications session to his portable cellular phone, and once he enters his home, the session may again be transitioned to a speaker phone system within the home that is utilizing an unlicensed communications band (e.g., WiFi, VOIP, etc.). Thus, system 100 provides for maintaining a current communications session with minimal or no interruptions and allows the user to transition the session and utilize different communications resources as they become available and advantageous given current user state and preference.

Cognitive mobile device 102 is employed by a user, and based on user state 104 (the state can be any one or more of states 1-Z, where Z is an integer), and user preferences 108 (the preferences can be any one or more of preferences 1-W, where W is all integer) given he user state 104, mobile device 102 can transition a communication session to employ different set(s) of resources 106 (Resource$_{1-X}$, where X is an integer). The resources can for example be different types of devices (e.g., other cognitive devices, speaker phones, car phones, VOIP systems, computers, wireless phones that utilize unlicensed bands and/or licensed bands, interactive televisions, video phones, appliances with communications capabilities, service providers, communications platforms, personal data assistants, web-based systems, push to talk systems, walkie talkies, and any other type of resources suitable for facilitating communications in accordance with aspects described herein).

As can be appreciated Contactors to device 102 or recipients of communications there from (hereinafter referred to as target$_{N-1}$, N being an integer 110) also will impact if and how a communications session is transitioned. For example. in the aforementioned scenario regarding user leaving his car and walking into his home, if the target 110 is the user's client or employer the user may not want to risk multiple transitions of the session (e.g., car phone to cell phone, and cell phone using licensed band to home phone using unlicensed band), Accordingly, as a function of the target, system 100 may only transition the session from the car phone to the cell phone using the licensed band. Such decision can also be based on extrinsic information$_{-R}$ 112 (R being an integer) such as for example, fidelity of communications, cost associated with dropping the session, potential for loss of fidelity associated with other resources (e.g., moving from high quality licensed band to lower quality unlicensed band), dog barking or children playing near land-line phone, potential for echo, feedback noise, historical information. etc. For example, extrinsic information 112' includes information on potential for echoes, acoustic noise near a telephone and/or dog barking acoustic noise. Thus, if system 100 expects with reasonable certainty or probability that transitioning a session to another set of resources may sacrifice quality of the session, and given the importance of the target or context associated with the particular session decide to maintain the session with the. current employed set of resources rather than migrating the session and being potentially exposed to loss of quality associated with the session.

Mobile device 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 102 can be, for example, cellular phones, smart phones, laptops, handheld communication devices, handheld computing devices, satellite radios, global positioning systems, PDAs, and/or any other suitable device for communicating over wireless network 100.

FIG. 2a illustrates a high-level system diagram of various components in accordance with one particular aspect of mobile device 200. A resource sensing component 202 searches for available resources in connection with current and expected location and state of device 200 and user thereof. As can be appreciated, there are a variety of wireless communication systems, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.11 wireless LAN or Blue Tooth techniques. Such systems may provide services at different geographical areas. Therefore, it is desired that device 200 be capable of obtaining service from multiple systems.

In some cases, several different systems may provide services in geographically overlapping areas. Moreover, service quality may be different for a different system. For example, for a given device, signal quality of one system may be better than that of another system, and service charge of one system may be lower than that of another system. A device capable of employing multiple systems can select a best system to receive service at a given time. Resource sensing component 200 can monitor for available resources as well as resources soon to be available (as well as soon to be no longer available) in connection with receiving services and utilization of other resources (e.g., devices, software, functionalities, etc.)

Device 200 is capable of obtaining communication services from one or more available systems. For example, device 200 may work in an OFDMA FDD system as well as in an ad hoc network system. Device 200 can include one of a plurality of RF transceiver processing chains, and common digital signal processing hardware. The common digital signal processing hardware can be loaded with different software images, one corresponding to an OFDMA FDD system and another corresponding to an ad hoc system. Device 200 may also include other hardware, e.g., ASIC, components, which are used exclusively by one of the two systems. In at least one of the systems of which the device 200 is capable, a beacon signal can be sent by an access point to facilitate system identification, acquisition, synchronization to assist device 200 in checking availability of the spectrum. The access point in the system is typically a gateway through which device 200 can access a large network, e.g., the Internet. The access point can also be a stand alone device, transmitting certain pre-defined signals to help the device 200 utilize spectrum in the area.

A beacon signal includes a sequence of beacon signal bursts in a spectrum band. A beacon signal burst includes one or more (a small number) beacon symbols. In an exemplary orthogonal frequency division multiplexing (OFDM) system, a beacon symbol is a single tone over an OFDM symbol period. A beacon signal burst can include a small number of beacon symbols of a single tone over a small number of transmission symbol periods e.g., one or two symbol periods. The beacon signal bursts are transmitted in an intermittent (non-continuous) manner so that there are a number of symbol periods between first and second beacon signal bursts. Successive beacon signal bursts may use different tones according to a predetermined or pseudo random tone hopping sequence, for example. In another aspect, a beacon symbol can be an impulse signal. Device 200 can detect the beacon signal with little complexity. In an OFDM system, device 200 can perform a fast Fourier transform (FFT) operation on the received signal to transform the signal to frequency domain. Resource sensing component 202 can detect a beacon signal if one of the FFT output elements carries significantly higher energy than average. In an impulse signal case, resource sensing component 202 can check time domain samples of a received signal, and detect a beacon signal if one of the samples carriers has significantly higher energy than average.

In one particular aspect, an access point can send a beacon signal according to a pre-defined schedule. The access point may also transmit other data/control signals, called regular signals. The beacon signal can be overlaid to the regular signals. In some cases, the access point may only send the beacon signal. It is possible that the beacon signals may be transmitted in all systems of which device 200 is capable. It is also possible that the beacon signals are transmitted in only a subset of systems of which device 200 is capable.

Before device 200 starts to employ a system of which it is capable and in which the beacon signal is sent, resource sensing component 202 searches for a beacon signal to determine state of the system. For example, suppose that device 200 is capable of both an OFDMA FDD system and an ad hoc network system and that both systems send beacon signals—when the device 200 powers up, or moves into a new area, resource sensing component 202 initially searches for the beacon. If resource sensing component 202 can detect the beacon from an OFDMA FDD access point, device 200 knows that it can obtain service from an OFDMA FDD access point. If resource sensing component 202 cannot detect a beacon from an ad hoc network access point, device 200 will know that it can use a corresponding spectrum for peer-to-peer communication. Note that the beacon for the OFDMA FDD system may be in a different spectrum band from the beacon for the ad hoc network, and uses a different signaling format. Moreover, it is to be appreciated that a protocol of using a beacon to check availability of service and spectrum may vary from one system to another.

Figure 2B:
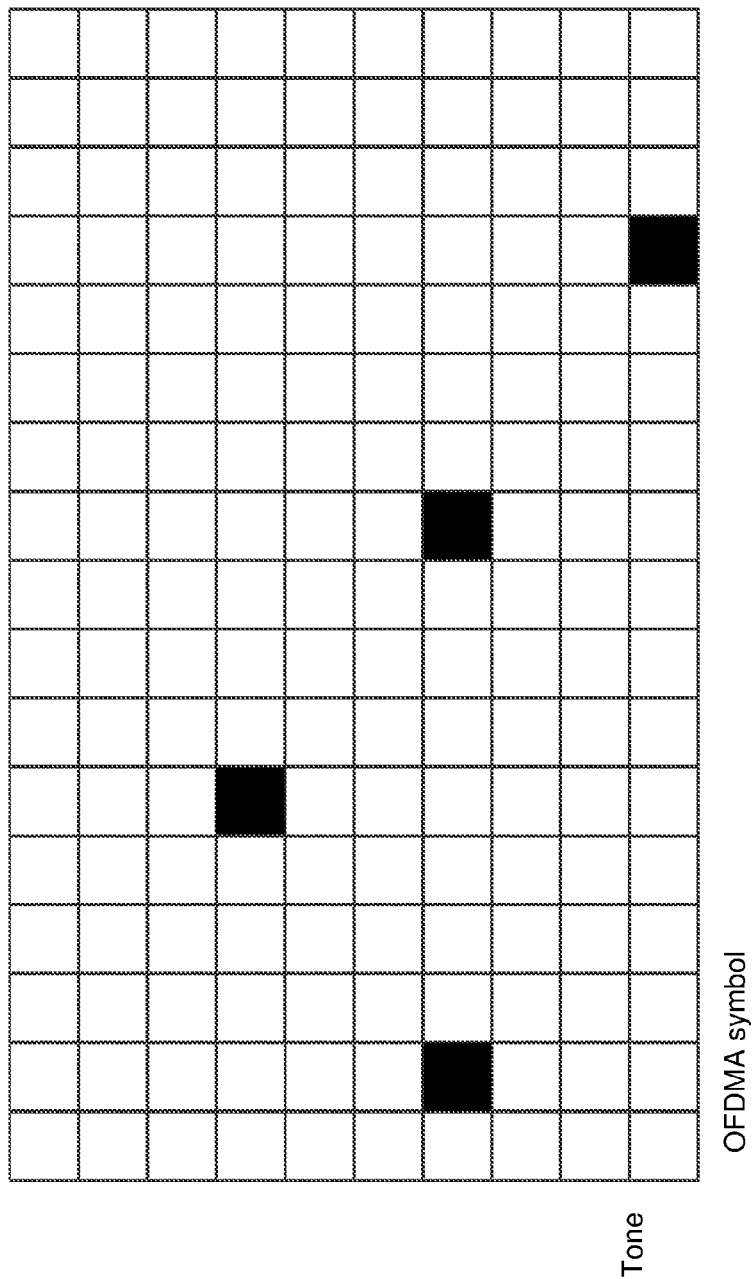
FIG. 2b illustrates a beacon signal and use of beacon signals in an exemplary OFDMA system and an exemplary ad hoc network system also using OFDM.

FIG. 2b illustrates beacon signal(s) and use of beacon signals in an exemplary OFDMA system and an exemplary ad hoc network system also using OFDM. The x-axis represents symbols, e.g., OFDM symbols in this example. The y-axis represents tones, e.g., subcarriers. Each small box represents a single tone in an OFDM symbol. A black box represents a beacon symbol, which occupies one degree of freedom in bandwidth resource. Over time, the beacon symbols hop according to certain hopping pattern, which conveys information bits, e.g., to identify type of system the transmitter is associated with. For example, the base station of the OFDMA system may transmit the base station beacon signal according to some hopping pattern, while an access point node in the ad hoc network may transmit the access point beacon signal according to a different hopping pattern. A user node in the ad hoc network may transmit the user beacon signal according to yet another different hopping sequence.

If resource sensing component 202 finds only one particular system is available to use, device 200 will proceed to employ that system. If resource sensing component 202 finds multiple systems are available, device 200 can select one or more of them according to a selection criterion, or policies, such as signal quality or service charge. It is to be appreciated that in various aspects device 200 can be concurrently engaged with services and resources associated with more than one system.

A communications component 204 provides for establishing and maintaining communications with one or more parties utilizing hardware, software, and services as described herein. Transitioning component 206 provides for transitioning a communication session from one set of resources to another. Transitioning component can utilize other components and resources (e.g., memory, buffers, etc.) to facilitate seamless transitioning of the session. It will be appreciated that a session can be overlapped between sets of resources to provide for redundancy to mitigate loss of the session. For example, multiple devices, protocols, services etc. can be utilized concurrently to ensure that the session is seamlessly transitioned from one set of resources to another set of resources. Accordingly, transitioning component 206 can provide for multiple devices and resources to coordinate until particular devices and other resources are deemed to be used for a pre-determined time prior to another communication session transition being initiated.

A particular example of how transitioning component 206 can provide for such session transitioning is if it is determined that a cellular telephone using a licensed band is intended to be transitioned to a home speaker system using an unlicensed band. As the transitioning is initiating, transitioning component 206 can pre-fetch and activate new resources (e.g., home speaker system, and resources associated with the unlicensed band), so that they are concurrently activated with present resources associated with the current session. More particularly, for example, the session maybe conducted across both sets of resources (current and intended new set) until it is deemed the entire set of new resources are being used and the previous set is no longer necessary—at such point in time, transitioning component 206 can drop the previous set of resources. It is to be appreciated that various filters, and functionalities can be employed to mitigate effects of noise, cross-talk, feedback, etc. that might result as an undesired bi-product of concurrently employing multiple sets of resources in connection with a communications session. Moreover suitable hand-off policies, software layers, protocols, hardware and software can be employed in connection with resource transitioning as described herein.

An alternative aspect of transitioning component 206 can include an option that allows the user to make a hard transition to the new set of resources. Transitioning component 206 can likewise provide a notice to the user and the target recipient that the session is being transferred to a new set of resources. Transitioning component 206 can in one aspect perform such transitioning automatically, and in alternative aspects provide options and notifications so that the user can effect transitioning manually or semi-automatically.

It is to be appreciated that various technologies such as voice recognition, inference, gaze recognition, advanced quality of service guarantee mechanisms, etc. can be employed to allow the user to initiate transitioning of a session to another set of resources. For example, a user can request that the target recipient hold on for a moment while she transitions the call to another set of resources within her home. She could voice a command such as move the session to the land-line and transitioning component 206 would facilitate managing such transitioning of the communications session. In another example, as quality of service is believed to be lower in a particular upcoming zone (e.g., known dead spot), the communications session can be transitioning to counter in advanced deficiencies associated with such zone. Likewise, a target can also request the user be transitioning to another set Processing component 210 carries out processing functions associated with one or more of components and functions described herein. Processing component can include a single or multiple set of processors or multi-core processors. Moreover, processing component 210 can be implemented as an integrated processing system and/or a distributed processing system. Memory 212 can include random access memory (RAM), read only memory (ROM), and a combination thereof. Data store 214 can be any suitable combination of hardware and/or software that provides for mass storage of information, databases, and programs employed in connection with aspects described herein.

Mobile device 200 can optionally include an artificial intelligence component employing principles of artificial intelligence (AI) 216 to facilitate automatically performing various aspects (e.g., transitioning communications session, analyzing resources, extrinsic information, user state, and preferences, risk assessment) as described herein. AI component 216 can optionally include an inference component 218 that can further enhance automated aspects of the AI component utilizing in part inference based schemes to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

FIG. 3 illustrates an aspect of a system 300 where a service provider 302 manages transitioning of communications sessions. Service provider 302 performs functions similar to that described herein with mobile device 102 (see FIG. 1 and corresponding discussion) in connection with analyzing user state 104, resources 106, preferences 108, target(s) 110, and extrinsic information 112. For sake of brevity and to avoid redundancy, discussions regarding various components/states/preferences, etc. and associated aspects thereof will not be repeated.

Service provider 302 can for example be a licensed band provider and a subscriber/user can subscribe to a set of services that include service provider provisioning and transitioning of user resources. A user can designate a set of resources well as preferences and policies associated with such resources and allow service provider 302 to manage communication sessions and transitioning thereof. A user interface can be provided as part of a web-based application for example to allow a user to publish available resources as well as subscribe to service provider provided resources, and select and set preferences regarding transition preferences, target importance, user state conditions, etc to facilitate service provider 302 in connection with transitioning communications sessions in a manner consistent with user needs and preferences given state, context, and extrinsic information, for example.

FIG. 4 illustrates a high-level system architecture 400 of an aspect where different sets of resources (1-P, where P is an integer) 402 form a distributed communications provisioning and transitioning system or network. It is to be appreciated that various resource sets can include like or common sub-resources (e.g., same service, devices, protocols, etc.). Respective sets of resources 402 coordinate amongst one another and coordinate transitioning a communication session 404 from one set of resources to another. It is to be appreciated that respective sets of resources can employ components, services, functionalities described herein in connection with other aspects. These resources sets can also include different service providers that form partnerships to facilitate handoff of a session. Moreover, these resources can also include devices that triage capabilities and coordinate execution of functionalities as part of a distributed effort to maintain a communication session in accordance with aspects described herein. In other words, the devices and services can coordinate in order to achieve desired goals (e.g., QoS, lowest cost, minimal disruption, optimize user convenience/satisfaction, load balancing, etc.) in connection with a communication session.

In view of exemplary aspects described herein, methodologies that can be implemented in accordance with the disclosed subject matter are discussed. While, for purposes of simplicity, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement respective methodologies. It is to be appreciated that the functionality associated with various blocks may be implemented by software, hardware, a combination thereof or any other suitable means (e.g., device, system, process, component). Additionally, it should be further appreciated that some methodologies disclosed hereinafter and throughout this specification are capable of being stored on an article of manufacture to facilitate transporting and transferring such methodologies to various devices. Those skilled in the art will appreciate and understand that a methodology can alternatively be represented as a series of interrelated states or events such as for example in a state diagram.

Figure 5:
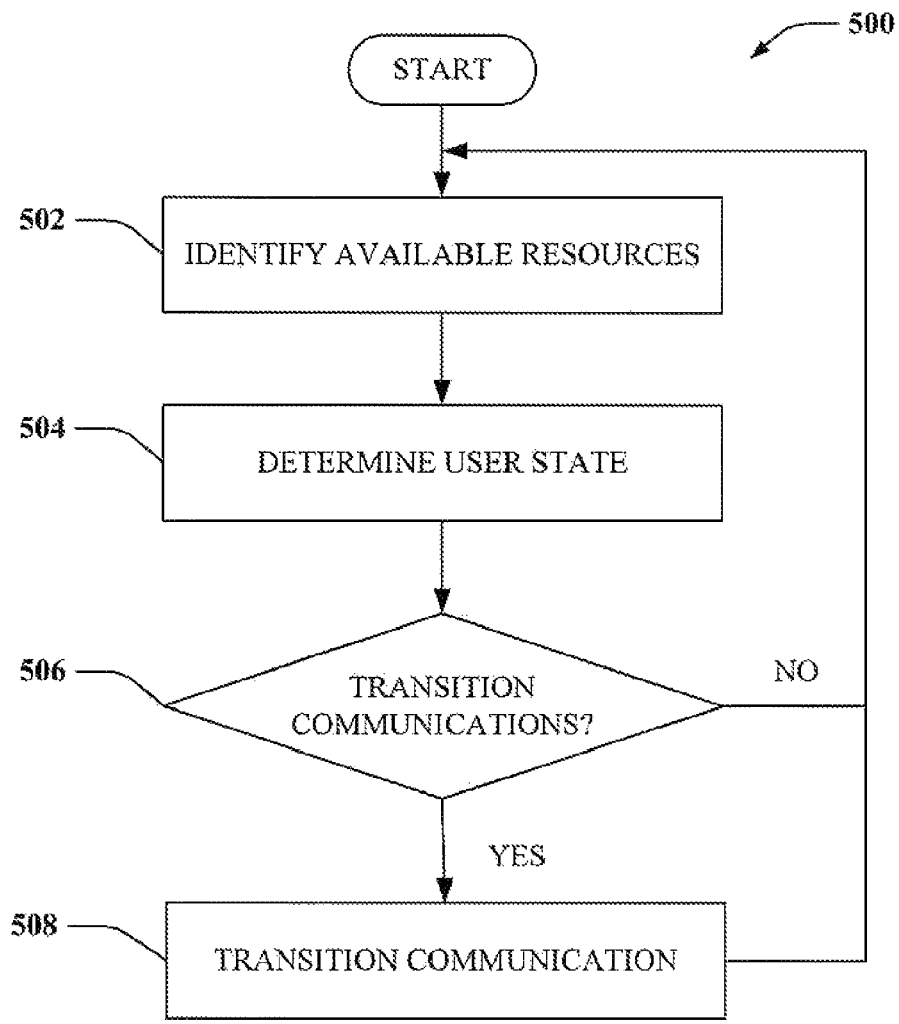
FIG. 5 illustrates a methodology for transitioning a communication session among resources in accordance with one or more aspects described herein.

FIG. 5 illustrates a high level methodology 500 for transitioning a communication session. At 502 available resources (e.g., service providers, hardware, software, devices, systems, networks, etc.) are identified. At 504 user state (e.g., driving, who he/she is communicating with, context of communication, requirements of communications, priority, location, current used resources, available resources, preferences, anticipated upcoming change in user state, resources, preferences, change in environment, etc.) is determined or inferred. Given the determined or inferred user state and identified available resources, at 506 a determination is made regarding whether or not to transition the communication session from the current set of resources to another set of resources. This determination can include a utility-based analysis that factors cost of making a transition (e.g., loss of fidelity, dropping the call, user annoyance, interrupting the session, etc.) against the potential benefit (e.g., better quality of service, user satisfaction, saving money, making available enhanced functionalities associated with a new set of resources). This determination can also include a cost-benefit analysis. The cost can be measured by such factors as the power consumption, interference generated, bandwidth occupied, and the cost of the bandwidth (e.g., licensed versus unlicensed spectrum) in order to support the desired communication session using different sets of resources. The benefit can be measured by such factors as the quality of the service, the data rate, the latency, etc. The decision can be made based on a probabilistic-based analysis where the transition is initiated if a confidence level is high, and not initiated if the confidence level if low. As discussed above, AI-based techniques (including machine-learning systems) can be employed in connection with such determination or inference. Alternatively, a more simple rule-based process can be employed where if certain conditions are satisfied the transition will occur, and if not the transition will not be initiated.

As mentioned supra, the transition making determination can be automated, semi-automated, or manual. At 506, if it is determined or inferred that a transition should not be made at the current time, the process returns to 502. If it is determined or inferred that a transition of the communication session should be made the process proceeds to 508 where the session is transitioned to a new set of resources. Thereafter, the process returns to 502. The methodology can be continuously performed as a background process to provide for real-time transitioning of communication sessions in order to enhance user utilization of available resources and enhance the current communication session. Alternatively, the methodology can be performed at pre-determined intervals, or triggered based oil events (e.g., expected loss of a resource, or drop in quality of a service, etc.)

Figure 6:
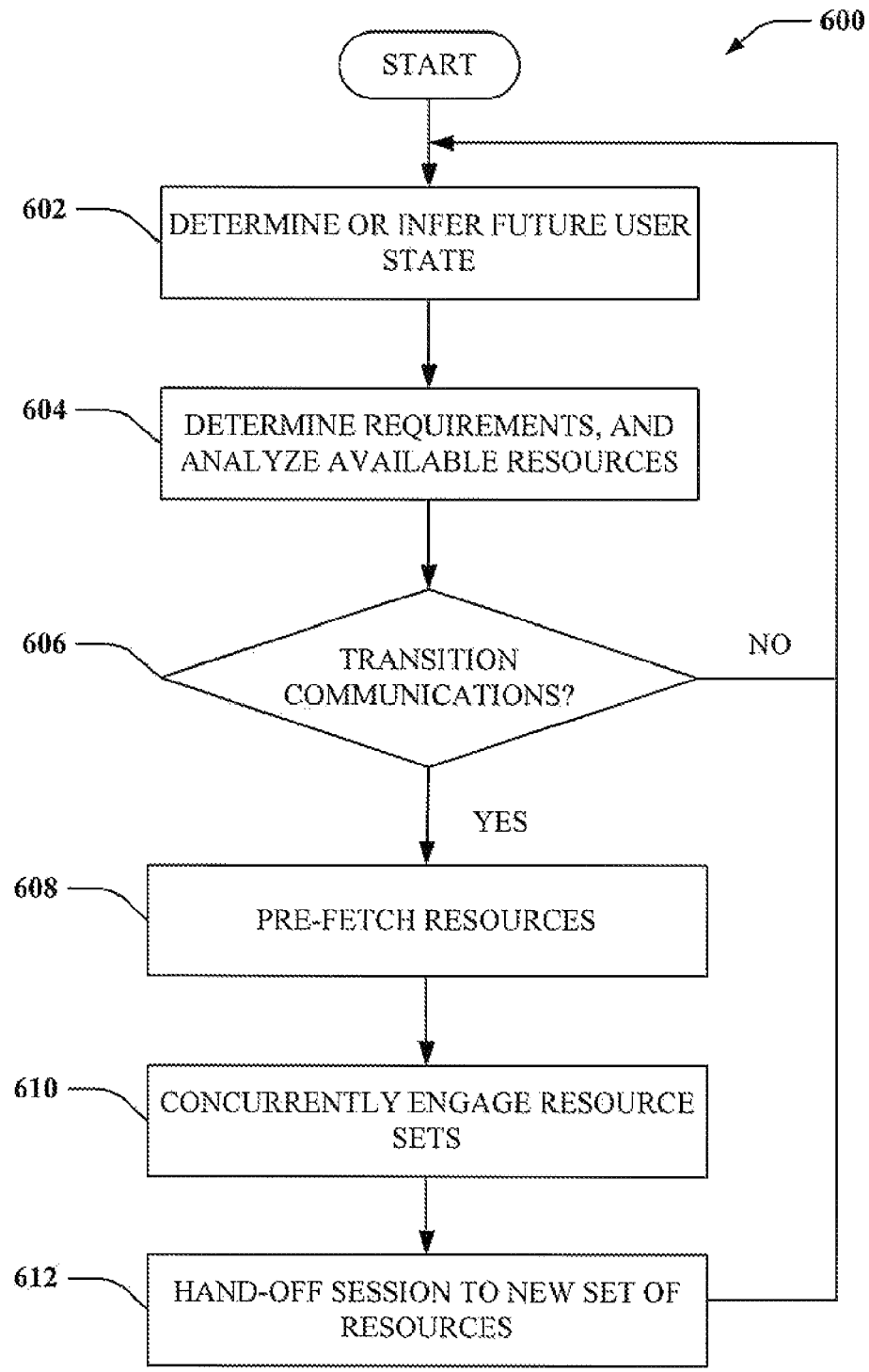
FIG. 6 illustrates a methodology for transitioning a communication session among resources in accordance with one or more aspects described herein.

FIG. 6 illustrates a methodology 600 that relates to facilitating transitioning of a communication session from a current set of resources to a new set of resources. At 602, future user state is determined or inferred. For example, if a user is driving a vehicle, and according to a location based monitoring service (e.g., GPS, wireless tracking, etc.) it is determined that the user is approaching a zone that has different available communications resources. At 604, requirements for the current communications given user state, preferences, current resources available and anticipated resources available in the upcoming zone are determined. The available resources in the upcoming zone can be obtained from a variety of sources including web-based publications or searching, wireless broadcasting of resources, look-up tables, databases, and a variety of other suitable means. A new set of resources taking into consideration what is believed to be available in the upcoming zone is defined. The new set can for example include a subset of resources current being used as well as a subset of resources not currently available but will be available in the new zone.

At 606, it is determined or inferred if the communication sessions should be transitioned to a new set of resources prior to or during the upcoming zone. If no, the process proceeds back to 602. If yes, at 608 resources required to form the new set of resources are obtained—of course some resources may be currently employed and such resources would not need to be pre-fetched. Once the resources for the new set are acquired, at 610 the new set of resources is concurrently engaged with the current set of resources in connection with the communication session. At 612, once it is confirmed that the new set of resources are being utilized by the user, and the old set not required the old set of resources is dropped from use. Resources that are common to the old and new sets would not be dropped. Thereafter, the process would return to 602.

Figure 7:
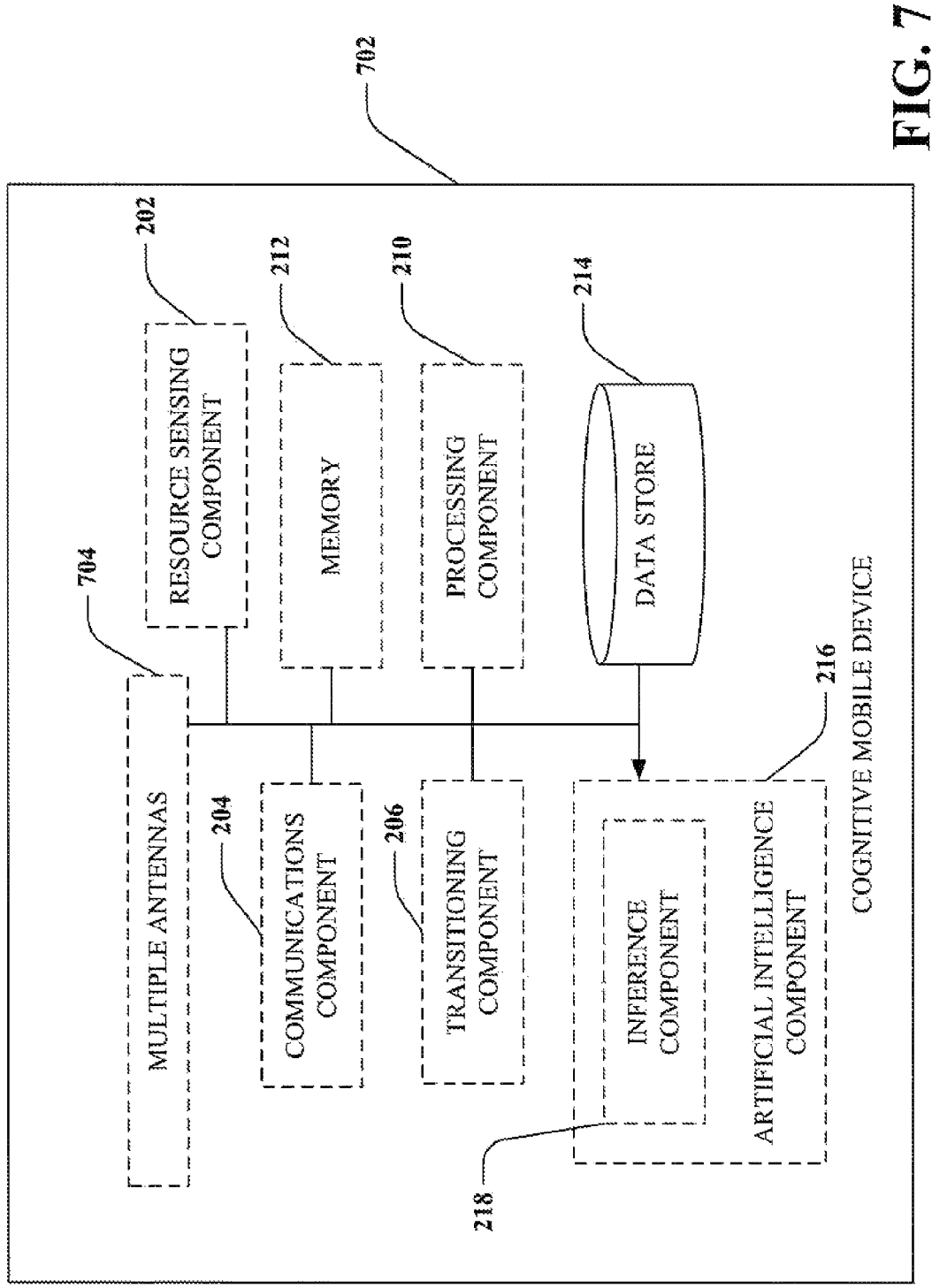
FIG. 7 is an illustration of a cognitive mobile device in accordance with one or more aspects described herein.

FIG. 7 illustrates an aspect of a cognitive mobile device 702 with multiple antennas 704. Descriptions regarding components that are in common to that of cognitive mobile device 202 (see FIG. 2) already presented will not be repeated for sake of brevity. Device 702 can employ a variety of antennas in connection with series and/or parallel employment of protocols, services and resources. Although the previous discussion focused largely on transitioning of a session among different sets of resources, it is to be appreciated that during a current session additional resources can be added to the session and utilized. For example, if a user is having a phone conversation with an individual using device 702, and the target party sends the user a document during the conversation device 702 can add additional resources in connection with the received document. A currently used antenna may be for carrying on the conversation using a licensed band (e.g., CDMA, GSM), and communications component 204 can concurrently activate a second antenna employed for WiFi (e.g., blue tooth) communications to allow the user to send the document to a nearby printer or large screen for printing or viewing. Accordingly, the current communication was not transitioned but rather augmented with additional resources device 702 determined were available and would enhance the current communications session.

Figure 8:
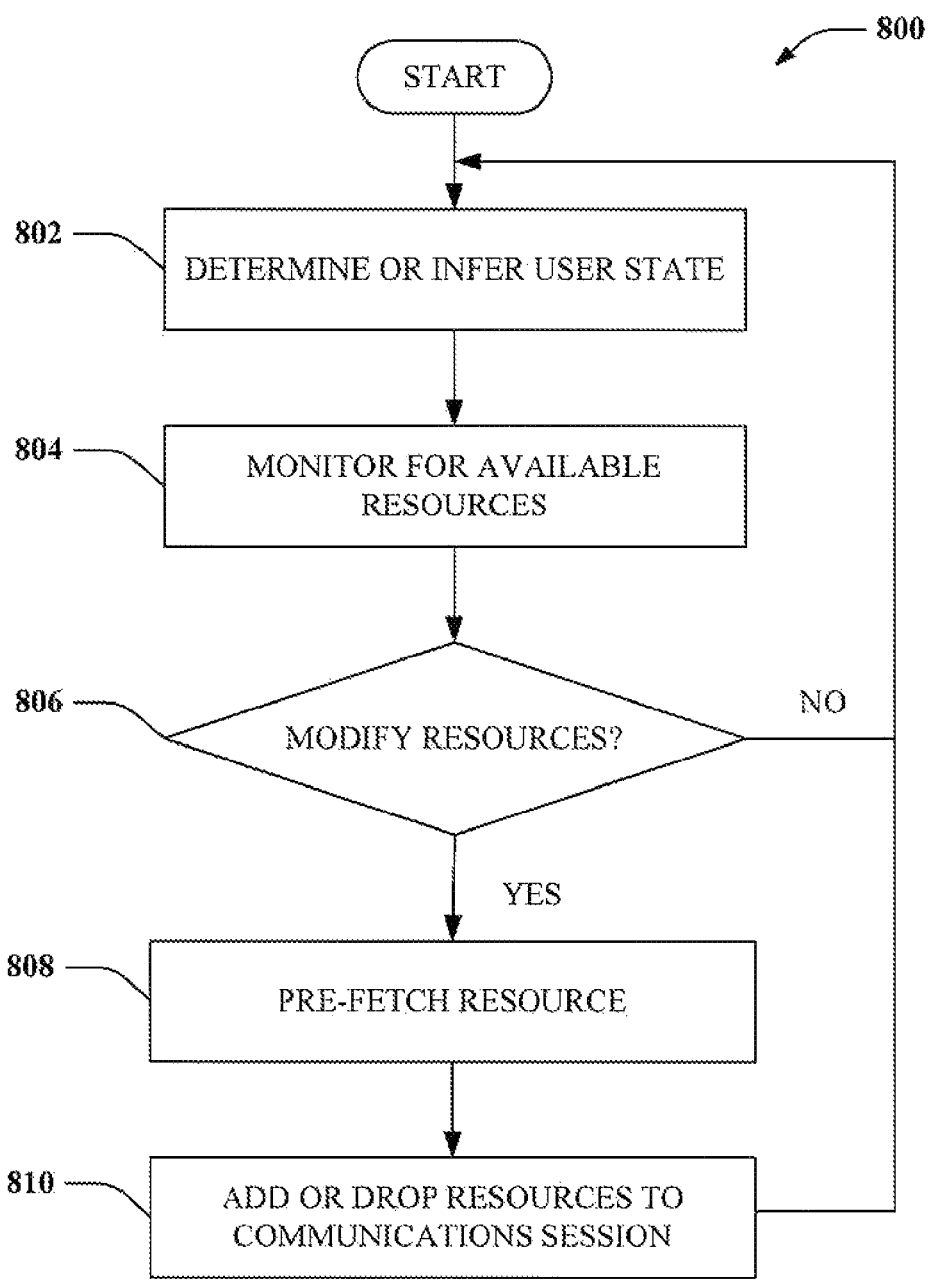
FIG. 8 illustrates a methodology for transitioning a communication session among resources in accordance with one or more aspects described herein.

FIG. 8 illustrates a methodology 800 relating to identifying available resources and augmenting a current communications session. At 802, user state is determined or inferred. For example, location of a user, identity of other party in communication, context of the communication, priority of communication, user preferences, cost of communication, can be determined or inferred. At 804, available resources are determined—this can include identifying resources associated with currently employed device, other available devices, services, platforms, etc. At 806, a decision is made regarding whether or not to modify the current set of resources. If no, the process returns to 802. If yes, additional resources that would enhance the current communication session are pre-fetched. These resources can include simply activating a currently available resource that was not in use such as for example another antenna, a graphics processor, a speaker phone, an internet session, opening a background secondary session (e.g., Blue tooth session, UWB session, IP session, infrared communication, authentications session, encryption session, etc.) with another device or service to enhance the current communication session. At 810 resources are added and/or dropped in connection with enhancing the current communications session.

FIG. 9 is a Venn diagram of a subset of exemplary resources that may be available in connection with a communications session, and the respective resources are depicted in a manner to illustrate where such resources may be only available (to the exclusion of other resources), and where such resources may be concurrently available. It is to be appreciated that the respective resources may be available with differing concurrency than that illustrated depending on a particular environment, and the following is simply one particular example case to facilitate describing and understanding aspects mentioned herein. Licensed spectrum 902 overlaps with a wide range of other resources since such spectrum is often provided via cellular service providers that often provide coverage over an entire nation including indoors. Internet service 904 likewise overlaps with a number of resources including the licensed spectrum where cellular service providers for example often also provide Internet services. Global positioning system service is typically provided in conjunction with a licensed spectrum service via satellite and/or cellular. A car phone 908 often can employ GPS 906 and employs the licensed spectrum 902 as a function of mobility thereof. A multi-mode phone 910 can operate using multiple bands (e.g., GSM, CDMA, WiFi, VOIP) 910 and thus has overlap with substantial available resources. Blue tooth service 912 is generally associated with the unlicensed spectrum; however, it can be employed concurrently or in conjunction with licensed bands. VOIP services 914 often require Internet services, and voice communications services to function and therefore overlap with many of the other resources as well.

As can be appreciated from the diagram, various available resources overlap while other do not, some resources are dependent upon others, while certain resources are relative autonomous. Accordingly, knowledge of such resources, capabilities, limitations, costs, user preferences, availability, should be known a priori or learned quickly by devices and systems, or built-in via policies, look-up tables, databases, or the like so that utilization of such resources can be enhanced as part of cognitive device/service employment in connection with aspects described herein.

Figure 9A:
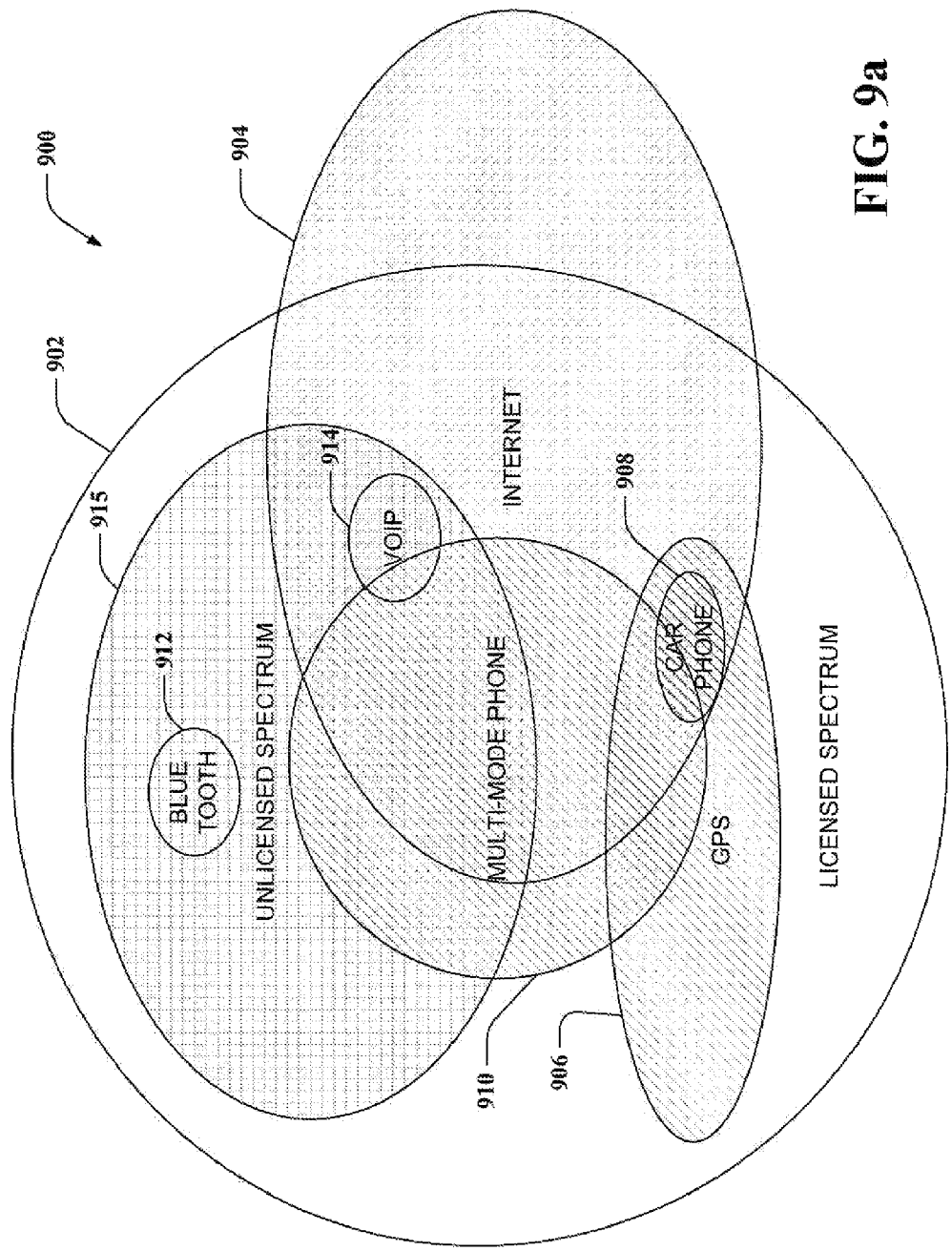
FIG. 9a is a Venn diagram illustrating example resources in accordance with one or more aspects described herein.
Figure 9B:
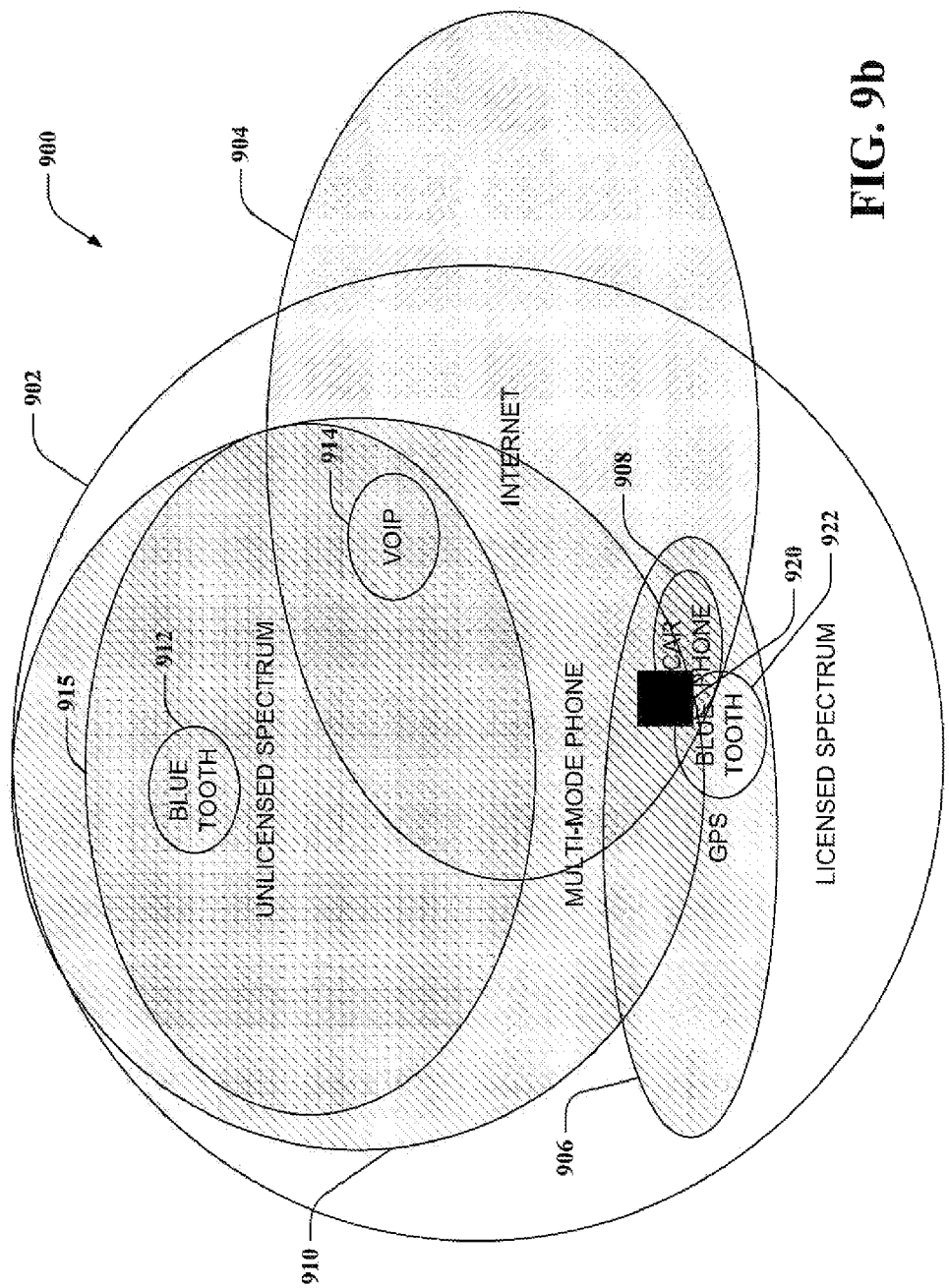
FIGS. 9b-9d are Venn diagrams illustrating a user moving through various locations, and associated communications that are available per location in accordance with one or more aspects described herein.
Figure 9C:
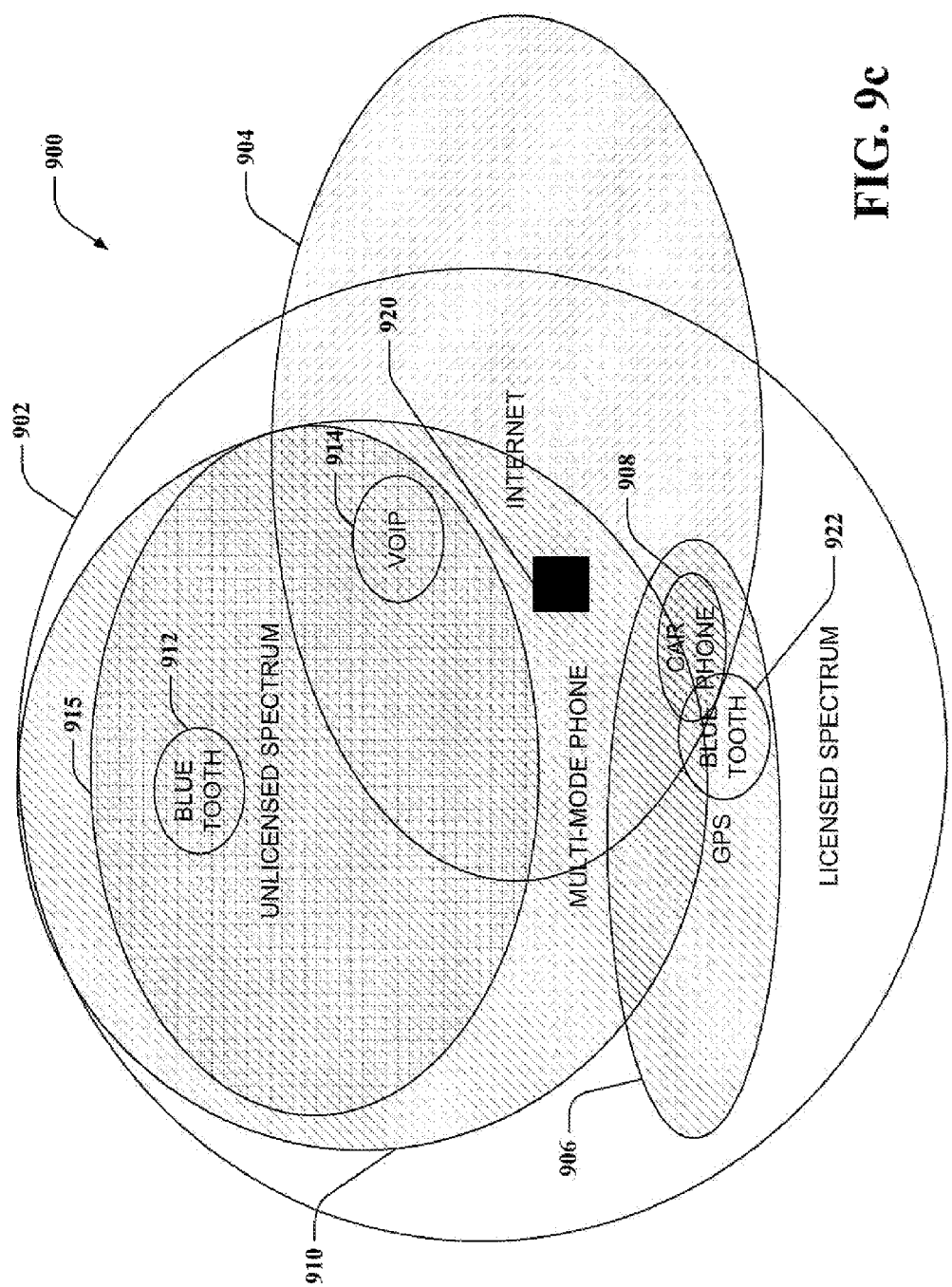
Figure 9D:
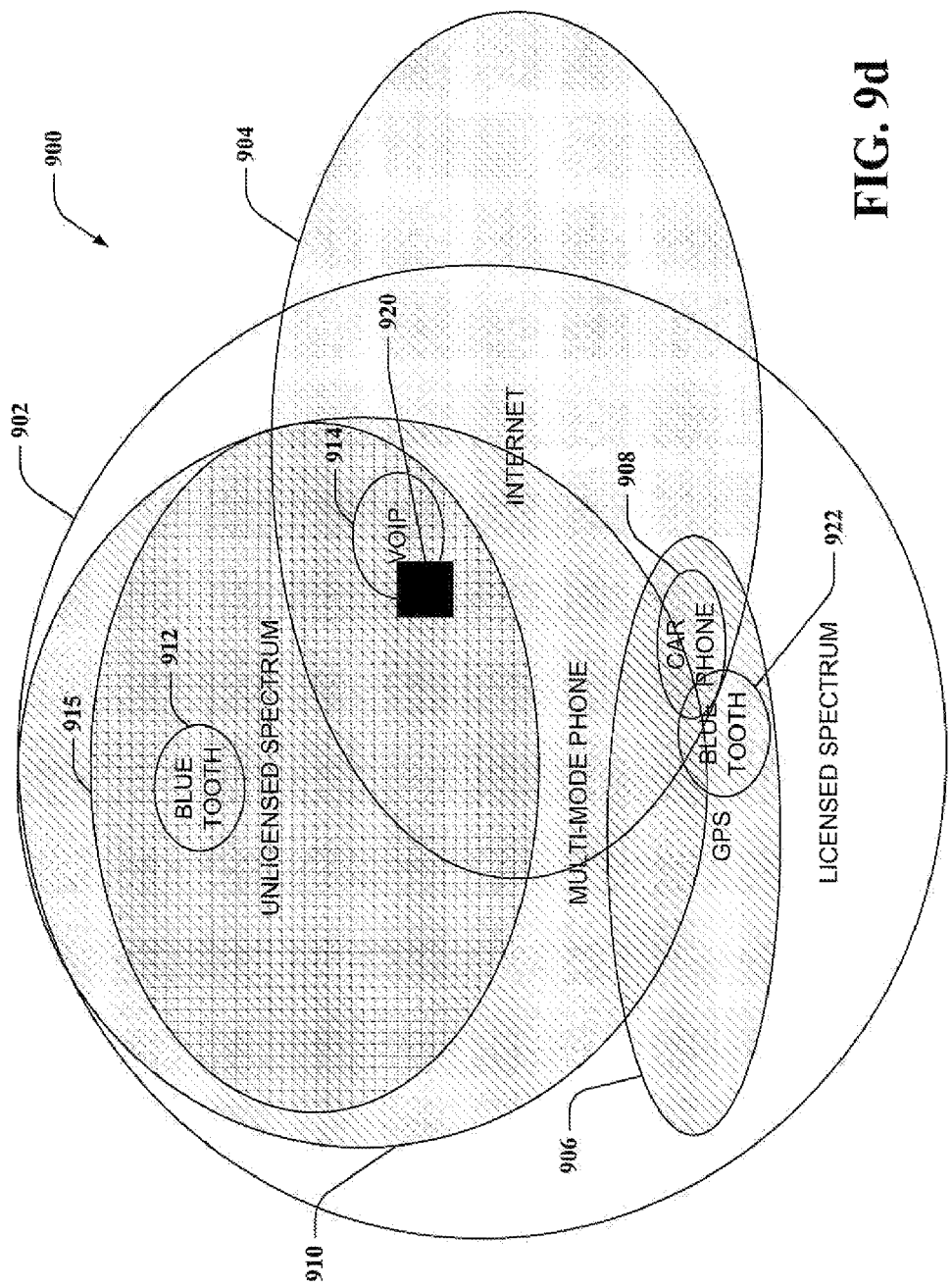

FIGS. 9b-9d illustrate an example case of a user charging states, and transitioning of a communication session through available resources as a function of user state, preferences, and available resources. In FIG. 9b, a user 920 is located in an automobile, and he is on a telephone call with a friend. Prior to entering the automobile, he was on the same call employing a cognitive multi-mode mobile device 910. His automobile is blue tooth capable 922, and upon starting the car the mobile device senses the blue tooth 922 and employs it to continue the conversation through speakers of the car (as is known conventionally). Alternatively, the conversation can be handed off to a car phone 908, and enhanced functionality (possibly not available with the device 910) associated with car phone 908 can be made available to the user as he is driving the car. Device 910 and car phone 908 have GPS capabilities and so the user is tracked as the car moves.

As a function of the movement, location based information can be passed to the user and during the conversation for example via employment of Internet 904. For example, location-based advertising or simply information may be targeted to the user to facilitate the conversations or simply the user (outside of the conversation). Accordingly, it can be appreciated that as resources become available such resources can be made available and employed to not only facilitate the conversation but also independently assist the user or even other people (e.g., a $3^{rd}$ party desiring to know the user's location, a person on the other end of a conversation, or even a service provider). Devices, services, and resources cooperate to concurrently provide functionality in accordance with aspects described herein as compared to such devices, services and resources working autonomously as is done conventionally.

FIG. 9c illustrates a change in user state where user 920 is in an area (e.g., garage) where GPS 906 functionality is no longer available. Moreover, the user is no longer in the automobile and thus blue tooth 922 and car phone 908 are not available. Accordingly, prior to entering such state, mobile device 910 or a service provider 302 determined or inferred destination (e.g., home) of the user, and anticipated loss of certain resources (GPS, blue tooth, and car phone). With such knowledge, the conversation was transitioned back to the mobile device 910 as the user picked up the device and proceeded out of the car. A variety of mechanisms (e.g., biometrics, accelerometers, voice activation, etc.) can be employed to determine or infer that the device 910 was intended to be used to carry on the conversation. The hand-off can be performed automatically, semi-automatically, or manually depending on preferences of the user or capabilities of particular device or service provider. As can be seen, Internet functionality 920 is still available to the user (e.g., via licensed band service provider). Thus, various functionalities and services provided to the use while in the car can optionally be provided to the user via the Internet and device 910.

FIG. 9d depicts the user changing state again (e.g., moving into his home) and still on the conversation. The user has a wireless network 915 within his home that is an unlicensed band. The user also employs a VOIP communications system at home (e.g., due to cost savings and various unique functionalities afforded by VOIP). As the user enters the home, the conversation is transitioned to the VOIP system. Prior to making such change, a determination or inference was made as to potential cost or downside associated with switching from a licensed band to an unlicensed band. Factors such as convenience to the user (e.g., using the device 910 versus a speaker or different handset in the home), party in conversation with the user, context of the communication, user preferences, extrinsic data, etc. are analyzed and given such analysis a transition is made or not made to this new set of available resources. Additionally, the conversation can optionally include both current used resources (licensed band and Internet), and additional resources concurrently made available or swapped (e.g., Internet access over licensed band is switched to Internet service provided by unlicensed band). The phone call can still be maintained on the licensed band, but a different blue tooth 912 service allows for the communication session on the licensed band to be broadcast over the home speaker system. Moreover, mobile device 910 can now receive incoming calls over the unlicensed network, and thus call holding, multi-way calls, etc. can be made available to the user via concurrently employment of licensed and unlicensed bands.

FIGS. 10-20 describe some example resources (hardware, software, protocols, services, etc.) that may be employed in connection with aspects described herein. It is to be appreciated that these are merely exemplary resources and the aspects are not limited to utilization of just these types of resources. Rather, it is contemplated that certain claimed aspects can employ any sets of resources suitable for carrying out the functionalities described herein.

Figure 10:
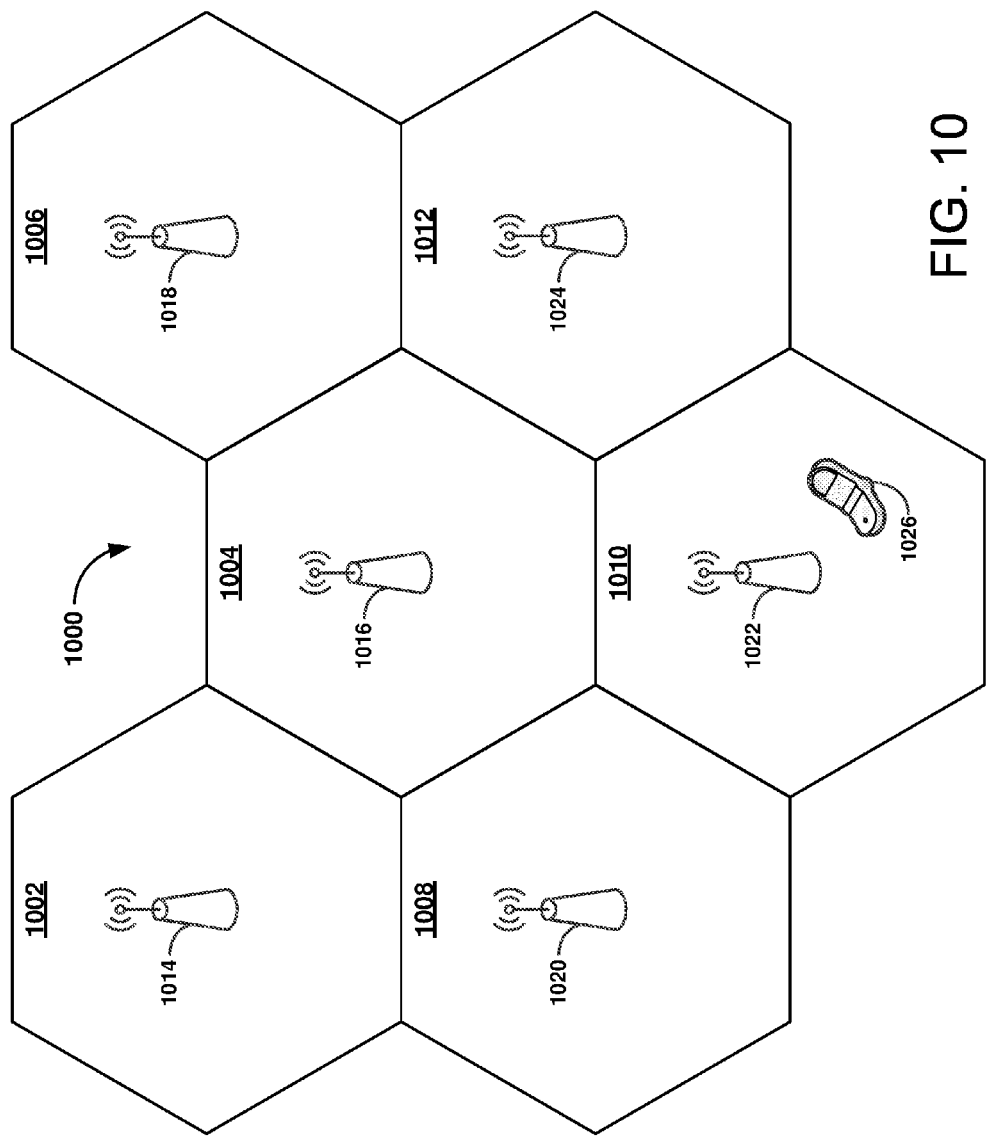
FIG. 10 is an illustration of an example wireless communications system in accordance with one or more aspects.

Turning to FIG. 10 an example wireless communications system 1000 is illustrated. System 1000 includes a plurality of sectors 1002-1012, wherein user equipment 1026 can employ wireless services within such sectors 1002-1012. While sectors 1002-1012 are shown as being hexagonal in nature and of substantially similar size, it is understood that size and shape of sectors 1002-1012 can vary depending upon geographical region, number, size, and shape of physical impediments, such as buildings, and several other factors. Access points 1014-1024 are associated with sectors 1002-1012, wherein access points 1014-1024 are utilized to provide services to user equipment 1026 within sectors 1002-1012. Access points 1014-1024 may transmit data in various frequency bands, such that user equipment 1026 cannot necessarily receive data from one access point while measuring the signal strength from another access point. Each of the access points 1014-1024 can provide service to multiple user equipment. In system 1000, user equipment 1026 is associated with sector 1010 and thus can be serviced by access point 1022. User equipment 1026, however, may be portable and can therefore move to disparate sectors (e.g., out of range for suitable communications from access point 1022). It is thus desirable to allow user equipment to request and receive measurement gaps from an access point servicing the user equipment.

In a particular example, user equipment 1026 can be serviced by access point 1022 (which is associated with sector 1010). As user equipment 1026 transitions close to a boundary of sector 1010, downlink signal quality associated with access point 1022 and user equipment 1026 can deteriorate.

When user equipment 1026 determines that signal quality has gone below a threshold, for instance, user equipment 1026 can request a measurement gap from access point 1022. Access point 1022 can receive such request and generate a schedule and provide the schedule to user equipment 1026, wherein the schedule indicates when the measurement gap will occur as well as length of the measurement gap. During the scheduled measurement gap, user equipment 1026 can stop listening to the downlink channel associated with access point 1022 and can perform measurements with respect to, for instance access point 1024. If the quality of signal is sufficiently high, access point 1024 can be considered a candidate for handover. While the above example indicates that user equipment 1026 generates a request and awaits receipt of such request and provision of a schedule from access point 1022, it is understood that various other protocols are contemplated. For instance, rather than requesting a measurement gap from access point 1022, user equipment 1026 can provide an indication to access point 1022 that user equipment 1026 is going to be obtaining measurements with respect to another access point (e.g., access point 1024). Access point 1022 can then cache data desirably provided to user equipment 1026, either to be transmitted to user equipment 1026 after it resumes receiving data from access point 1022, or for forwarding, to another access point for transmittal to user equipment 1026 after handover.

Figure 11A:
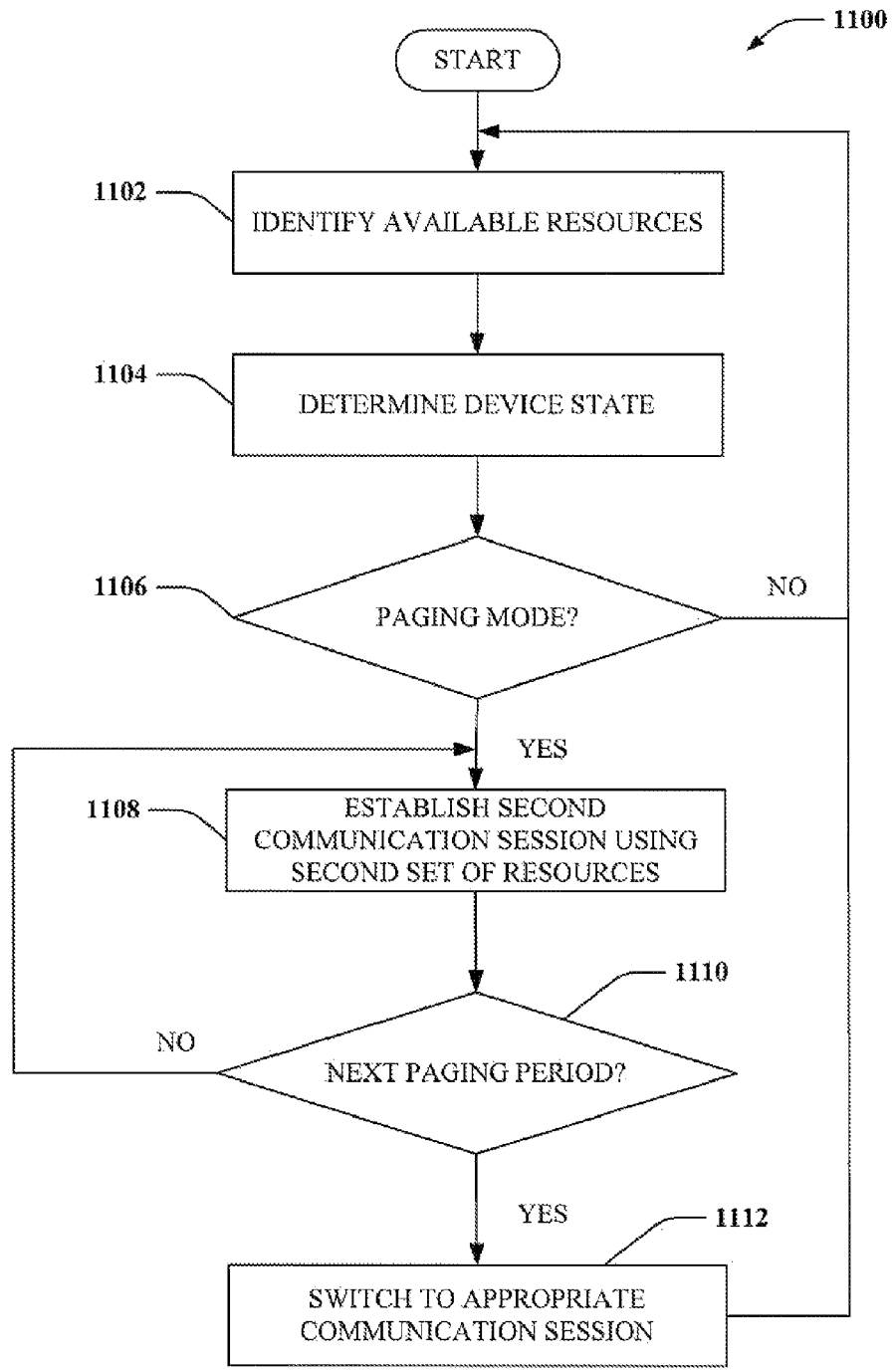
FIG. 11a illustrates a method for employing concurrent sessions using different sets of resources in accordance with various aspects.

FIG. 11a illustrates another aspect of the present invention. At 1102 available resources are identified, and suppose that a device has a first communication session using a first set of resource. For example, the first set of resource can be a wide area network using a licensed spectrum band, and the device may be connected with a cellular base station, e.g., using an OFDMA wide area network system. At 1104 device state is determined such as for example, the device may be determined to currently be in a suspended mode, e.g., a paging mode, in which the device does not always transmit or receive signals with the base station. At 1106, it is determined if the device is in a paging mode, the device may monitor the paging channel from the base station in a sequence of predetermined time periods. In-between those paging time periods, referred to as non-paging time periods, the device usually goes to a power-saving mode.

If yes, the device is in a paging mode, in accordance with one aspect of the invention, the device establishes or attempts to establish a second communication session at 1108 using a second set of resource in the non-paging time periods. For example, the second set of resource can a local area ad hoc or peer-to-peer network, using the same licensed spectrum band or another, possibly unlicensed spectrum band.

Therefore, the device monitors the paging channel of the first communication session in a paging time period. Once the paging time period expires, if the device is not paged, then the device is switched to the ad hoc or peer-to-peer for the second communication session. In the second communication session, the device may proactively send a user beacon signal to indicate its identifier, or search for user beacon signals sent by other devices. The user beacon signals are sent according to the ad hoc or peer-to-peer communication protocol, which is different from an airlink protocol used in the first set of resource. The device may furthermore actively communicate user data traffic with other devices in the second communication session. At 1110, it s determined if a next paging period has arrived. If yes, then when the next paging time period arrives, the device is switched at 1112 to a most appropriate communication session. For example, the device may temporarily suspend the second communication session, and return to the first communication session to check the paging channel. Again, if the device is not paged, it is switched back to the second communication session. If the device is paged, it may terminate the second communication session and migrate to a more active state in the first communication session. Alternatively, the device may make a choice of which communication session it needs to continue.

It is to be appreciated from the foregoing discussion that various embodiments described herein provide for concurrent sessions supported by different sets of resources, as well as transitioning among sets of resources, and a combination thereof.

Figure 11B:
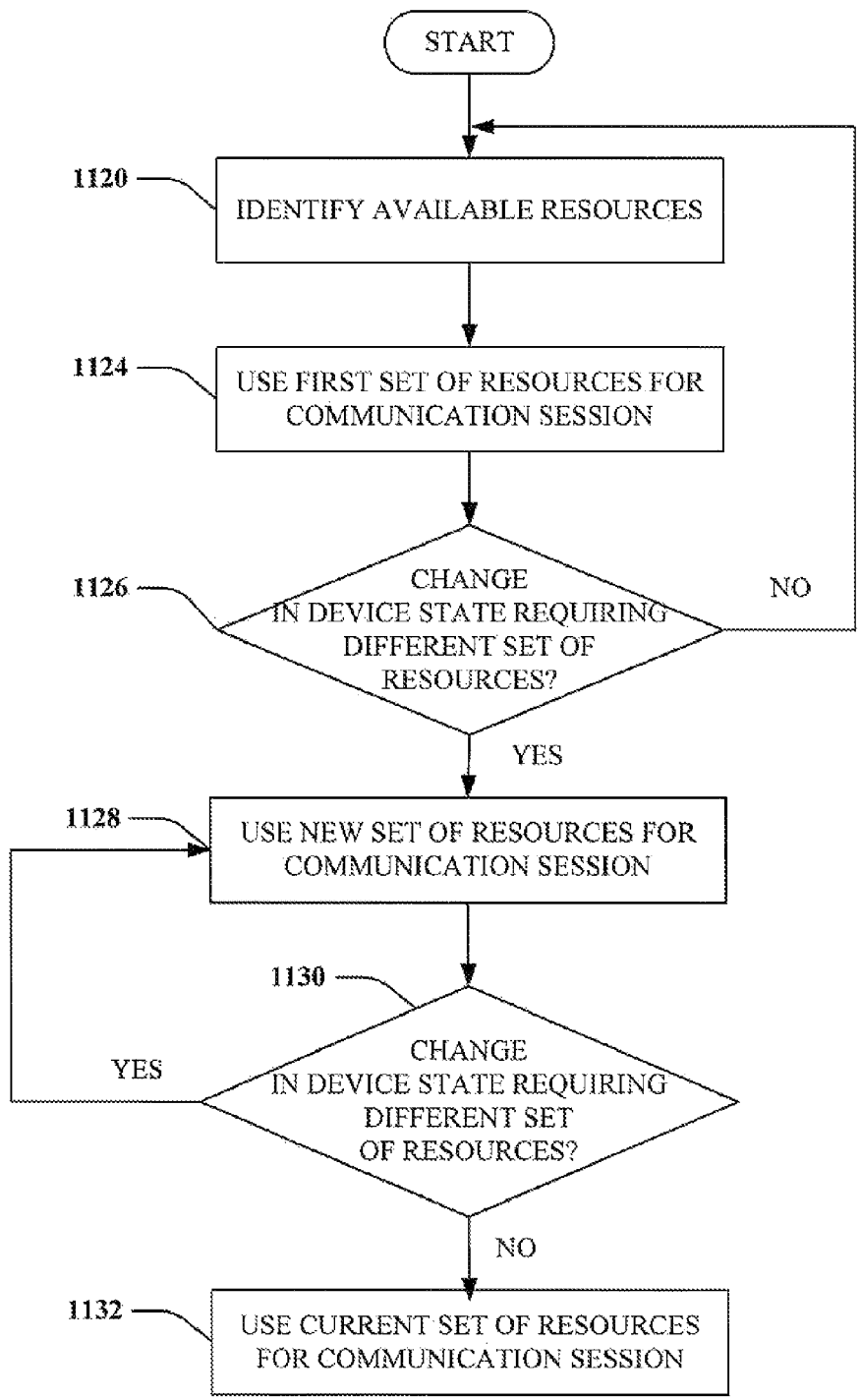
FIG. 11b illustrates a method for transitioning a session from one set of resources to another set of resources as a function of change in device or user state.

FIG. 11b illustrates another aspect of the present invention. Suppose that two devices are adjacent geographically. Then the two devices may be able to communicate directly with each other through a first set of resource, which is a direct peer-to-peer network using licensed or unlicensed spectrum band. Then, the two devices move away from each other and their distance increases so much that the direct peer-to-peer communication is not possible. The two devices sense the change of their states, and start to use a second set of resource, which is a multi-hop ad hoc network, to continue their communication session. Then, the two devices further move away from each other and their distance increases so much that even the multi-hop ad hoc network is not feasible or cost-effective. The two devices sense the change of their states, and start to use a third set of resource, which is a wide area cellular network, to continue their communication session.

At 1120 available resources are identified. At 1124 a communication session employs a first set of resources. At 1126, device (or use) state is monitored, and it is determined if any devices participating in the session has a change of state (e.g., physical movement, low signal, low power, etc.) requiring a different set of resources. If no, the session continues using the same set of resources. If yes, at 1128 the session is migrated to a new set of resources to accommodate for the change in device (or user) state so that the communication session can be carried out in a suitable manner. At 1130, device (or user) state is checked again with respect to the new set of resources, and if another change of state requires a different set of resources at 1130 the communication session is transitioned to another new set of resources at 1128. If no, the current set of resources is maintained at 1132.

Figure 12A:
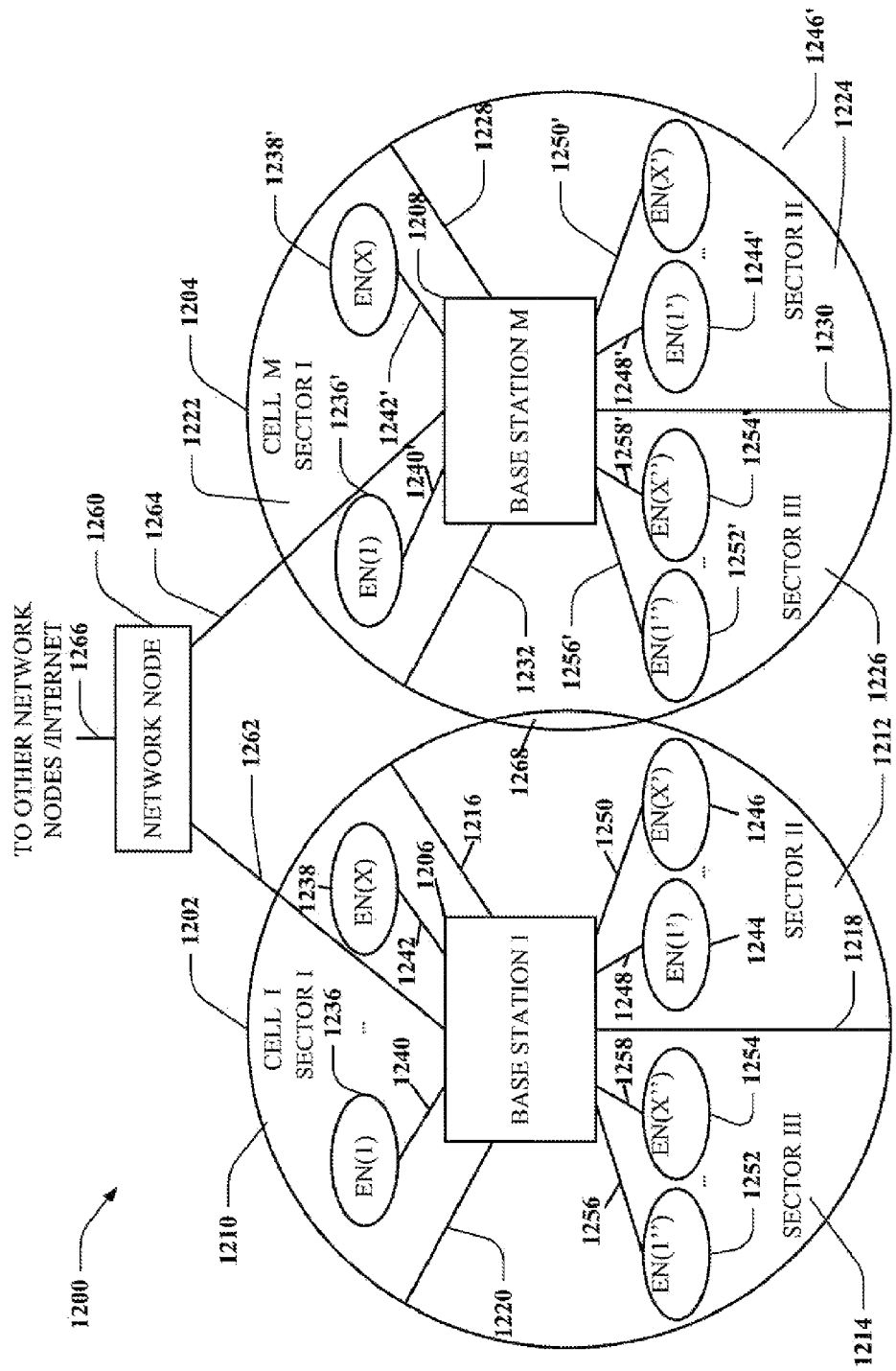
FIG. 12a illustrates a network diagram of an example communications system implemented in accordance with various aspects.

FIG. 12a depicts an example communication system 1200 implemented in accordance with various aspects including multiple cells: cell I 1202, cell M 1204. Note that neighboring cells 1202, 1204 overlap slightly, as indicated by cell boundary region 1268, thereby creating potential for signal interference between signals transmitted by base stations in neighboring cells. Each cell 1202, 1204 of system 1200 includes three sectors. Cells which have not be subdivided into multiple sectors (N=1), cells with two sectors (N=2) and cells with more than 3 sectors (N>3) are also possible in accordance with various aspects. Cell 1202 includes a first sector, sector I 1210, a second sector, sector II 1212, and a third sector, sector III 1214. Each sector 1210, 1212, 1214 has two sector boundary regions; each boundary region is shared between two adjacent sectors.

Sector boundary regions provide potential for signal interference between signals transmitted by base stations in neighboring sectors. Line 1216 represents a sector boundary region between sector I 1210 and sector II 1212; line 1218 represents a sector boundary region between sector II 1212 and sector III 1214; line 1220 represents a sector boundary region between sector III 1124 and sector I 1210. Similarly, cell M 1204 includes a first sector, sector I 1222, a second sector, sector II 1224, and a third sector, sector III 1226. Line 1228 represents a sector boundary region between sector I 1222 and sector II 1224; line 1230 represents a sector boundary region between sector II 1224 and sector III 1226; line 1232 represents a boundary region between sector III 1226 and sector I 1222. Cell I 1202 includes a base station (BS), base station I 1206, and a plurality of end nodes (ENs) in each sector 1210, 1212, 1214. Sector I 1210 includes EN(1) 1236 and EN(X) 1238 coupled to BS 1206 via wireless links 1240, 1242, respectively; sector II 1212 includes EN(1') 1244 and EN(X') 1246 coupled to BS 1206 via wireless links 1248, 1250, respectively; sector III 1214 includes EN(1") 1252 and EN(X") 1254 coupled to BS 1206 via wireless links 1256, 1258, respectively. Similarly, cell M 1204 includes base station M 1208, and a plurality of end nodes (ENs) in each sector 1222, 1224, 1226. Sector I 1222 includes EN(1) 1236' and EN(X) 1238' coupled, to BS M 1208 via wireless links 1240', 1242', respectively; sector II 1224 includes EN(1') 1244' and EN(X') 1246' coupled to BS M 1208 via wireless links 1248', 1250', respectively; sector 3 1226 includes EN(1") 1252' and EN(X") 1254' coupled to BS 1208 via wireless links 1256', 1258', respectively.

System 1200 also includes a network node 1260 which is coupled to BS I 1206 and BS M 1208 via network links 1262, 1264, respectively. Network node 1260 is also coupled to other network nodes, e.g., other base stations, AAA server nodes, intermediate nodes, routers, etc. and the Internet via network link 1266. Network links 1262, 1264, 1266 may be, e.g., fiber optic cables. Each end node, e.g. EN 1 1236 may be a wireless terminal including a transmitter as well as a receiver. The wireless terminals, e.g., EN(1) 1236 may move through system 1200 and may communicate via wireless links the base station in the cell in which the EN is currently located. The wireless terminals, (WTs), e.g. EN(1) 1236, may communicate with peer nodes, e.g., other WTs in system 1200 or outside system 1200 via a base station, e.g. BS 1206, and/or network node 1260. WTs, e.g., EN(1) 1236 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation methods along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Figure 12B:
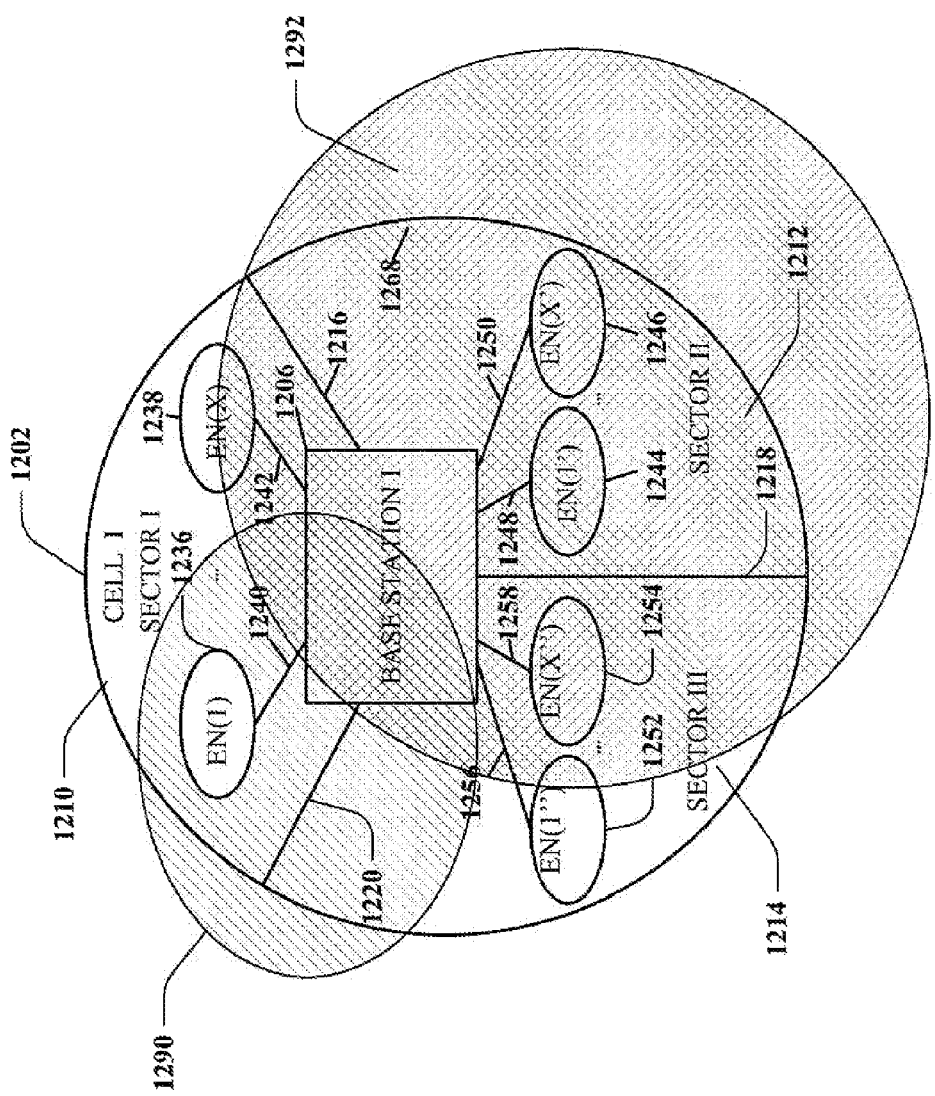
FIG. 12b illustrates a network diagram of an example communications system with multiple modes in accordance with various aspects.

FIG. 12b illustrates cell I 1202 with additional modes 1290 and 1292 available therein, Mode 1290 can be, for example, a VIOP mode that provides for devices within the modes range to be able to communicate with cellular as well as VOIP protocols. Mode 1292 provides for other suitable mode for carrying out communications (e.g., an unlicensed band, a different licensed band, etc.) by devices within the modes range. Where the various modes overlap it is to be appreciated that devices can employ one or more of such available modes (concurrently or serially). The various end nodes can seamlessly switch or concurrently employ available modes. Moreover, corresponding base stations can selectively convey communications using one or more of the available modes. Accordingly, devices whether transmitting and/or receiving can selectively employ one or more modes to optimize communications. It is to be appreciated that certain legacy-type devices may only be able to communicate with a specific mode, and multi-modal devices can dynamically switch modes in order to accommodate limitations associated with such legacy devices.

Figure 13:
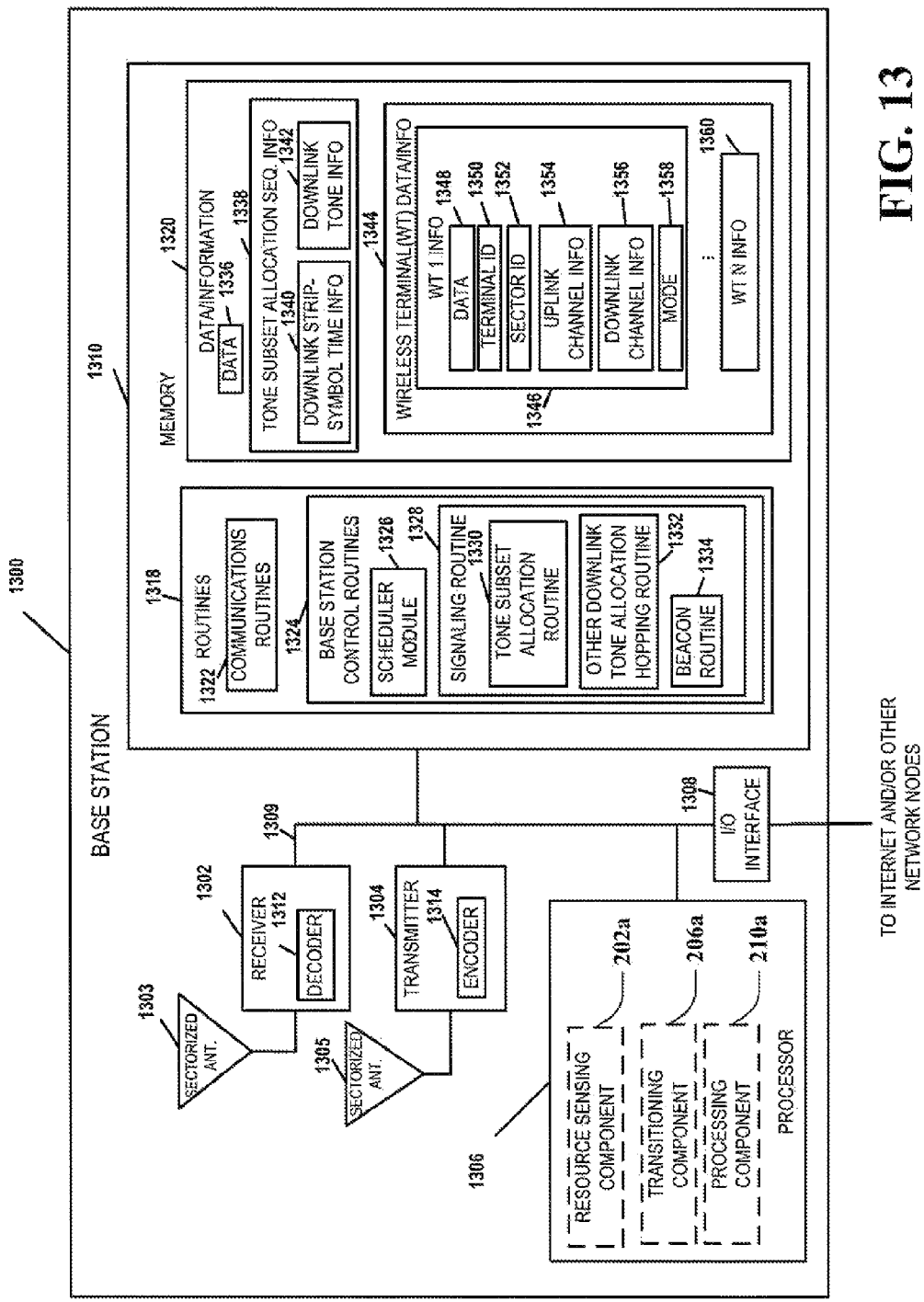
FIG. 13 illustrates an example base station implemented in accordance with various aspects.

FIG. 13 illustrates an example base station 1300 in accordance with various aspects. Base station 1300 implements tone subset allocation sequences, with different tone subset allocation sequences generated for respective different sector types of the cell. Base station 1300 may be used as any one of base stations 1206, 1208 of the system 1200 of FIG. 12. The base station 1300 includes a receiver 1302, a transmitter 1304, a processor 1306, e.g., CPU, an input/output interface 1308 and memory 1310 coupled together by a bus 1309 over which various elements 1302, 1304, 1306, 1308, and 1310 may interchange data and information.

Sectorized antenna 1303 coupled to receiver 1302 is used for receiving data and other signals, e.g., channel reports, from wireless terminals transmissions from each sector within the base station's cell. Sectorized antenna 1305 coupled to transmitter 1304 is used for transmitting data and other signals, e.g., control signals, pilot signal, beacon signals, etc. to wireless terminals 1400 (see FIG. 14) within each sector of the base station's cell. In various aspects, base station 1300 may employ multiple receivers 1302 and multiple transmitters 1304, e.g., an individual receivers 1302 for each sector and an individual transmitter 1304 for each sector. Processor 1306, may be, e.g., a general purpose central processing unit (CPU). Processor 1306 controls operation of base station 1300 under direction of one or more routines 1318 stored in memory 1310 and implements the methods. Processor includes a resource sensing components 202a, a transitioning component 206a, and a processing component 210a. Counterparts of these components and associated functionality are discussed in detail supra in connection with FIG. 2a, and further discussion in connection therewith is limited for sake of brevity and to minimize redundancy. I/O interface 1308 provides a connection to other network nodes, coupling the BS 1300 to other base stations, access routers, AAA server nodes, etc., other networks, and the Internet. Memory 1310 includes routines 1318 and data/information 1320.

Data/information 1320 includes data 1336, tone subset allocation sequence information 1338 including downlink strip-symbol time information 1340 and downlink tone information 1342, and wireless terminal (WT) data/info 1344 including a plurality of sets of WT information: WT 1 info 1346 and WT N info 1360. Each set of WT info, e.g., WT 1 info 1346 includes data 1348, terminal ID 1350, sector ID 1352, uplink channel information 1354, downlink channel information 1356, and mode information 1358.

Routines 1318 include communications routines 1322 and base station control routines 1324. Base station control routines 1324 includes a scheduler module 1326 and signaling routines 1328 including a tone subset allocation routine 1330 for strip-symbol periods, other downlink tone allocation hopping routine 1332 for the rest of symbol periods, e.g., non strip-symbol periods, and a beacon routine 1334.

Data 1336 includes data to be transmitted that will be sent to encoder 1314 of transmitter 1304 for encoding prior to transmission to WTs, and received data from WTs that has been processed through decoder 1312 of receiver 1302 following reception. Downlink strip-symbol time information 1340 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1342 includes information including a carrier frequency assigned to the base station 1300, the number and frequency of tones, and the set of tone subsets to be allocated to the strip-symbol periods, and other cell and sector specific values such as slope, slope index and sector type.

Data 1348 may include data that WT1 1400 has received a peer node, data that WT 1 1400 desires to be transmitted to a peer node, and downlink channel quality report feedback information. Terminal ID 1350 is a base station 1300 assigned ID that identifies WT 1 1400. Sector ID 1352 includes information identifying the sector in which WT1 1400 is operating. Sector ID 1352 can be used, for example, to determine the sector type. Uplink channel information 1354 includes information identifying channel segments that have been allocated by scheduler 1326 for WT1 1400 to use, e.g., uplink traffic channel segments for data, dedicated uplink control channels for requests, power control, timing control, etc. Each uplink channel assigned to WT1 1400 includes one or more logical tones, each logical tone following an uplink hopping sequence. Downlink channel information 1356 includes information identifying channel segments that have been allocated by scheduler 1326 to carry data and/or information to WT1 1400, e.g., downlink traffic channel segments for user data. Each downlink channel assigned to WT1 1400 includes one or more logical tones, each following a downlink hopping sequence. Mode information 1358 includes information identifying the state of operation of WT1 1400, e.g. sleep, hold, on.

Communications routines 1322 control the base station 1300 to perform various communications operations and implement various communications protocols. Base station control routines 1324 are used to control the base station 1300 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1328 controls the operation of receiver 1302 with its decoder 1312 and transmitter 1304 with its encoder 1314. The signaling routine 1328 is responsible controlling the generation of transmitted data 1336 and control information. Tone subset allocation routine 1330 constructs the tone subset to be used in a strip-symbol period using the method of the aspect and using data/info 1320 including downlink strip-symbol time info 1340 and sector ID 1352. The downlink tone subset allocation sequences will be different for each sector type in a cell and different for adjacent cells. The WTs 1400 receive the signals in the strip-symbol periods in accordance with the downlink tone subset allocation sequences; the base station 1300 uses the same downlink tone subset allocation sequences in order to generate the transmitted signals. Other downlink tone allocation hopping routine 1332 constructs downlink tone hopping sequences, using a information including downlink tone information 1342, and downlink channel information 1356, for the symbol periods other than the strip-symbol periods. The downlink data tone hopping sequences are synchronized across the sectors of a cell. Beacon routine 1334 controls the transmission of a beacon signal, e.g., a signal of relatively high power signal concentrated on one or a few tones, which may be used for synchronization purposes e.g., to synchronize the frame timing structure of the downlink signal and therefore the tone subset allocation sequence with respect to ultra-slot boundary.

Figure 14:
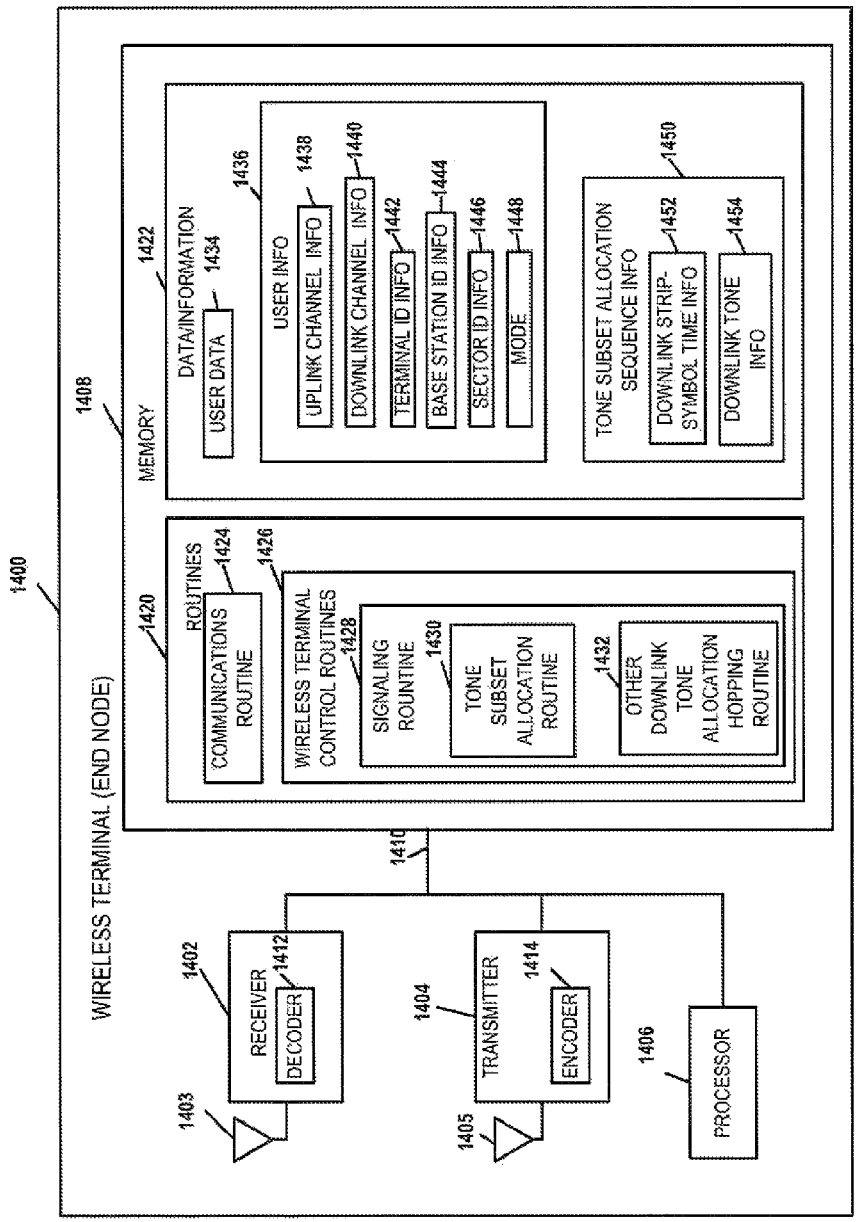
FIG. 14 illustrates an example wireless terminal implemented in accordance with various aspects.

FIG. 14 illustrates an example wireless terminal (end node) 1400 which can be used as any one of the wireless terminals (end nodes), e.g., EN(1) 1236, of the system 1200 shown in FIG. 12. Wireless terminal 1400 implements the tone subset allocation sequences. The wireless terminal 1400 includes a receiver 1402 including a decoder 1412, a transmitter 1404 including an encoder 1414, a processor 1406, and memory 1408 which are coupled together by a bus 1410 over which the various elements 1402, 1404, 1406, 1408 can interchange data and information. An antenna 1403 used for receiving signals from a base station 200 is coupled to receiver 1402. An antenna 1405 used for transmitting signals, e.g., to base station 200 is coupled to transmitter 1404.

The processor 1406, e.g., a CPU controls the operation of the wireless terminal 1400 and implements methods by executing routines 1420 and using data/information 1422 in memory 1408.

Data/information 1422 includes user data 1434, user information 1436, and tone subset allocation sequence information 1450. User data 1434 may include data, intended for a peer node, which will be routed to encoder 1414 for encoding prior to transmission by transmitter 1404 to base station 200, and data received from the base station 200 which has been processed by the decoder 1412 in receiver 1402. User information 1436 includes uplink channel information 1438, downlink channel information 1440, terminal ID information 1442, base station ID information 1444, sector ID information 1446, and node information 1448. Uplink channel information 1438 includes information identifying uplink channels segments that have been assigned by base station 200 for wireless terminal 1400 to use when transmitting to the base station 200. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1440 includes information identifying downlink channel segments that have been assigned by base station 200 to WT 1400 for use when BS 200 is transmitting data/information to WT 1400. Downlink channels may include downlink traffic channels and assignment channels, each downlink channel including one or more logical tone, each logical tone following a downlink hopping sequence, which is synchronized between each sector of the cell.

User info 1436 also includes terminal ID information 1442, which is a base station 200 assigned identification, base station ID information 1444 which identifies the specific base station 200 that WT has established communications with, and sector ID info 1446 which identifies the specific sector of the cell where WT 1400 is presently located. Base station ID 1444 provides a cell slope value and sector ID info 1446 provides a sector index type; the cell slope value and sector index type may be used to derive tone hopping sequences. Mode information 1448 also included in user info 1436 identifies whether the WT 1400 is in sleep mode, hold mode, or on mode.

Tone subset allocation sequence information 1450 includes downlink strip-symbol time information 1452 and downlink tone information 1454. Downlink strip-symbol time information 1452 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1454 includes information including a carrier frequency assigned to the base station 200, the number and frequency of tones, and the set of tone subsets to be allocated to the strip-symbol periods, and other cell and sector specific values such as slope, slope index and sector type.

Routines 1420 include communications routines 1424 and wireless terminal control routines 1426. Communications routines 1424 control the various communications protocols used by WT 1400. Wireless terminal control routines 1426 controls basic wireless terminal 1400 functionality including the control of the receiver 1402 and transmitter 1404. Wireless terminal control routines 1426 include the signaling routine 1428. The signaling routine 1428 includes a tone subset allocation routine 1430 for the strip-symbol periods and an other downlink tone allocation hopping routine 1432 for the rest of symbol periods, e.g., non strip-symbol periods. Tone subset allocation routine 1430 uses user data/info 1422 including downlink channel information 1440, base station ID info 1444, e.g., slope index and sector type, and downlink tone information 1454 in order to generate the downlink tone subset allocation sequences in accordance with some aspects and process received data transmitted from base station 200. Other downlink tone allocation hopping routine 1430 constructs downlink tone hopping sequences, using information including downlink tone information 1454, and downlink channel information 1440, for the symbol periods other than the strip-symbol periods. Tone subset allocation routine 1430, when executed by processor 1406, is used to determine when and on which tones the wireless terminal 1400 is to receive one or more strip-symbol signals from the base station 1200. The uplink tone allocation hopping routine 1430 uses a tone subset allocation function, along with information received from the base station 1200, to determine the tones in which it should transmit on.

Figure 15:
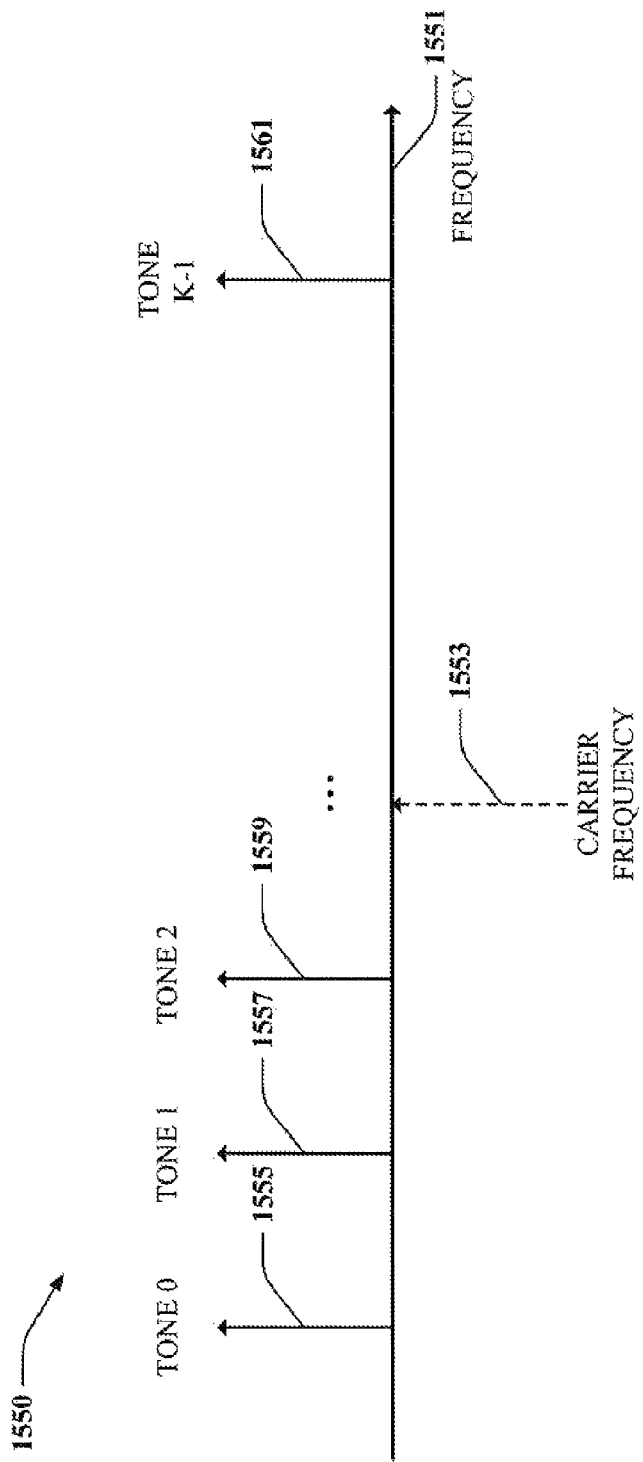
FIG. 15 illustrates an example tone set used in an OFDM system.

FIG. 15 illustrates the OFDM spread spectrum air interface technology of various aspects, implemented for each sector of each of the cells (1202,1204) of FIG. 12. In FIG. 15, horizontal axis 1551 represents frequency. The total amount of available bandwidth for a particular carrier frequency 1553, e.g., for downlink signaling, is divided into a number, K, of equally spaced tones. In some aspects, there are 113 equally spaced tones. These tones are indexed from 0 to K−1. Example tones: tone 0 1555, tone 1 1557, tone 2 1559 and tone K−1 1561 are illustrated in FIG. 15. The bandwidth is used simultaneously each of the sectors 1210, 1212, 1214, 1222, 1224, 1226 comprising the two cells 1202, 1204. In each sector of each cell, the tones, 0 through K−1, are used in each sector of each cell respectively to transmit downlink signals. Since the same bandwidth is used in each sector of both the cells 1202, 1204, the signals transmitted by different cells and sectors on the frequency tones at the same time may interfere with each other, e.g., in the overlapping coverage areas, e.g. sector boundary areas 1216, 1218, 1220, 1228, 1230, 1232 and cell boundary areas 1268.

For a software implementation, the techniques described herein may be implemented with means (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of wireless data transmission, comprising:
   determining a current communications state or inferring a future user equipment state in connection with a communication session;
   deciding whether to transition from a first set of resources including a first subscriber station to a second set of resources including a second subscriber station as a function of at least one of: i) a cost associated with dropping the communication session; or ii) identity of a party to the communication session in communication with a user of the first subscriber station; and
   when it is decided to transition from the first set of resources to the second set of resources, transitioning the communication session from the first set of resources to the second set of resources as a function of the determined current communications state or inferred user equipment state, said transitioning including transitioning the communication session from the first subscriber station to the second subscriber station.

2. The method of claim 1, wherein deciding whether to transition from a first set of resources to a second set of resources is a function of the identity of a party to the communication session in communications with a user of the first subscriber station.

3. The method of claim 1, wherein deciding whether to transition from a first set of resources to a second set of resources is performed differently when a client or employer of a user is a party to the call then when a client or employer is not party to the call.

4. The method of claim 2, comprising:
   determining user state; and
   selecting the second set of resources as a function of the determined user state.

5. The method of claim 3, comprising selecting the second set of resources as a function of the inferred user state.

6. The method of claim 1, wherein deciding whether to transition from a first set of resources to a second set of resources is a function of a cost associated with dropping the communication session.

7. A method of wireless data transmission, comprising:
   determining a current communications state or inferring a future user equipment state in connection with a communication session;
   deciding whether to transition from a first set of resources including a first subscriber station to a second set of resources including a second subscriber station as a function of at least one of: i) a cost associated with dropping the communication session; ii) potential for echo; iii) feedback noise; or iv) identity of a party to the communication session in communication with a user of the first subscriber station; and
   when it is decided to transition from the first set of resources to the second set of resources, transitioning the communication session from the first set of resources to the second set of resources as a function of the determined current communications state or inferred user equipment state, said transitioning including transitioning the communication session from the first subscriber station to the second subscriber station; and wherein deciding whether to transition from a first set of resources to a second set of resources is performed in accordance with stored user preferences and the potential for echoes.

8. The method of claim 1 comprising transitioning the communication session to the second set of resources as a function of cost of resources.

9. The method of claim 1 comprising transitioning the communication session to the second set of resources as a function of predefined policies.

10. The method of claim 1, comprising transitioning the communication session to the second set of resources as a function of user historical information.

11. The method of claim 1, comprising transitioning the communication session to the second set of resources as a function of identity of $3^{rd}$ party in communication with a user.

12. The method of claim 1, comprising transitioning the communication session to the second set of resources as a function of resource optimization.

13. The method of claim 1, comprising transitioning the communication session to the second set of resources as a function of user movement.

14. The method of claim 1, comprising transitioning the communication session to the second set of resources as a function of communication context.

15. The method of claim 1, comprising concurrently employing both sets of resources during the transitioning.

16. The method of claim 15, comprising ceasing to employ the first set of resources after confirmation that the second set of resources are functioning properly.

17. The method of claim 1, comprising pre-fetching the subset of the second set of resources as a function of predicted future state of the user equipment.

18. The method of claim 1, comprising pre-fetching the subset of the second set of resources as a function of predicted future state of a user.

19. The method of claim 1, comprising pre-fetching the subset of the second set of resources as a function of expected loss of a subset of the first set of resources.

20. The method of claim 1, comprising transitioning the communication session from a CDMA service to a GSM service.

21. The method of claim 1, comprising transitioning the communication session from a GSM service to a CDMA service.

22. The method of claim 1, comprising transitioning the communication session from a CDMA service to an OFDM service.

23. The method of claim 1, comprising transitioning the communication session from an OFDM service to a CDMA service.

24. The method of claim 1, comprising transitioning the communication session from an OFDM service to a GSM service.

25. The method of claim 1, comprising transitioning the communication session from a GSM service to an OFDM service.

26. The method of claim 1, comprising transitioning the communication session from a licensed band to an unlicensed band.

27. The method of claim 1, comprising transitioning the communication session from an un-licensed band to a licensed band.

28. The method of claim 1, wherein said first subscriber station is a car phone and said second subscriber station is a cell phone.

29. An apparatus that facilitates wireless data transmission, comprises:
a processing component that executes computer-based instructions to determine a current communications state or infer a future user equipment state;
a module for deciding, during a communication session, whether to transition from a first set of resources including a first subscriber station to a second set of resources including a second subscriber station as a function of at least one of: i) a cost associated with dropping the communication session; or ii) identity of a party to the communication session in communication with a user of the first subscriber station; and
a transitioning component that transitions the communication session, when it is decided to transition from the first set of resources to the second set of resources, from the first set of resources to the second set of resources as a function of the determined current communications state or inferred user equipment state, said transitioning component transitioning the communication session from the first subscriber station to the second subscriber station.

30. The apparatus of claim 29, comprising an artificial intelligence component that employs machine learning techniques to facilitate the determination of inference regarding user equipment state.

31. The apparatus of claim 29, comprising a communication component that provides for multi-modal based communications.

32. The apparatus of claim 31, wherein the communication component can employ at least two of the following types of services: CDMA, OFDM, or GSM services.

33. The apparatus of claim 29, wherein the processing component performs a utility-based analysis in connection with selecting the second set of resources to employ.

34. The apparatus of claim 29, wherein the processing component automatically selects the second set of resources to be employed.

35. The apparatus of claim 29, wherein the processing component generates a user recommendation regarding the second set of resources.

36. The apparatus of claim 29, wherein the user state is determined as a function of information received from a location-based service.

37. The apparatus of claim 29, comprising N number of antennas, wherein N is greater than 1.

38. The apparatus of claim 29, wherein the communications component concurrently employs a subset of the N antennas.

39. An apparatus for wireless data transmission, comprising:
means for determining resource availability;
means for deciding whether to transition from a first set of resources including a first subscriber station to a second set of resources including a second subscriber station during a communication session as a function of at least one of: i) a cost associated with dropping the communication session; or ii) identity of a party to the communication session in communication with a user of the first subscriber station; and
means for transitioning the communication session, when it is decided by said means for deciding to transition from the first set of resources to the second set of resources, from said first set of resources to said second set of resources as a function of the determined resource availability, said means for transitioning transition the communication session from the first subscriber station to the second subscriber station.

40. The apparatus of claim 39, comprising means for determining or inferring user state associated with the communication.

41. The apparatus of claim 40, wherein the means for transitioning the communication factors the determined or inferred user state in connection with selection of the second set of resources.

42. The apparatus of claim 39, comprising means for concurrently employing the first and second set of resources.

43. A non-transitory computer-readable medium having stored thereon computer-executable instructions for controlling a communications device, the non-transitory computer-readable medium comprising:
  instructions for controlling said device to determine a current communications state or inferring a future user equipment state in connection with a communication session;
  instructions for controlling said device to decide whether to transition from a first set of resources including a first subscriber station to a second set of resources including a second subscriber station as a function of at least one of: i) a cost associated with dropping the communication session; or ii) identity of a party to the communication session in communication with a user of the first subscriber station; and
  instructions for controlling said device to transition the communication session, when it is decided to transition from the first set of resources to the second set of resources, from the first set of resources to the second of resources as a function of the determined current communications state or inferred user equipment state, said instructions controlling said device to transition the communication session from the first subscriber station to the second subscriber station.

44. The non-transitory computer-readable medium of claim 43, comprising instructions for controlling said device to determine user state.

45. The non-transitory computer-readable medium of claim 43, comprising instructions for controlling said device to infer user equipment state.

46. The non-transitory computer-readable medium of claim 43, comprising instructions for selecting the second set of resources as a function of the determined communications state.

47. The non-transitory computer-readable medium of claim 43, comprising instructions for selecting the second set of resources as a function of the inferred user equipment state.

48. The non-transitory computer-readable medium of claim 43, comprising instructions for identifying resources that will become unavailable in the future.

49. The non-transitory computer-readable medium of claim 43, comprising instructions for transitioning the communication session to the second set of resources as a function of user preferences.

50. The non-transitory computer-readable medium of claim 43, comprising instructions for transitioning the communication session to the second set of resources as a function of cost of resources.

51. The non-transitory computer-readable medium of claim 43, comprising instructions for transitioning the communication session to the second set of resources as a function of predefined policies.

52. The non-transitory computer-readable medium of claim 43, comprising instructions for transitioning the communication session to the second set of resources as a function of identity of $3^{rd}$ party in communication with a user.

53. A processor that executes instructions to facilitate wireless communications, the instructions comprising:
  instructions for determining a current communications state or inferring a future user equipment state in connection with a communication session;
  instructions for deciding whether to transition from a first set of resources including a first subscriber station to a second set of resources including a second subscriber station as a function of at least one of: i) a cost associated with dropping the communication session; or ii) identity of a party to the communication session in communication with a user of the first subscriber station; and
  instructions for transitioning the communication session, when it is decided to transition from the first set of resources to the second set of resources, from the first set of resources to the second of resources as a function of the determined current communications state or inferred user equipment state, said transitioning including transitioning the communication session from the first subscriber station to the second subscriber station.

54. A method of wireless data transmission provided by a communications service provider, comprising:
  monitoring, during a communication session, state of a user to determine a current communications state or infer a future user equipment state;
  deciding whether to transition from a first set of resources including a first subscriber station to a second set of resources including a second subscriber station as a function of at least one of: i) a cost associated with dropping the communication session; or ii) identity of a party to the communication session in communication with a user of the first subscriber station; and
  transitioning the communication session, when it is decided to transition from the first set of resources to the second set of resources, from a licensed communications band to an unlicensed communications band as a function of the current communications state or inferred user equipment state, said transitioning including transitioning the communication session from the first subscriber station to the second subscriber station.

55. A method of wireless data transmission provided by a communications service provider, comprising:
  monitoring, during a communication session, state of a user or user equipment state;
  deciding whether to transition from a first set of resources including a first subscriber station to a second set of resources including a second subscriber station as a function of at least one of: i) a cost associated with dropping the communication session; or ii) identity of a party to the communication session in communication with a user of the first subscriber station; and
  transitioning the communication session, when it is decided to transition from the first set of resources to the second set of resources, from a first communications band to a second communications band as a function of the state of the user or user equipment state, said transitioning including transitioning the communication session from the first subscriber station to the second subscriber station.

56. The method of claim 55, wherein the first communications band is an unlicensed communication band.

57. The method of claim 55, wherein the first communications band is a licensed communication band.

58. The method of claim 55 comprising determining that user equipment is in a suspend mode, said user equipment being one of said first and second subscriber stations.

59. The method of claim 58 comprising establishing a second communication session if the user equipment is in a paging mode.

60. The method of claim 59 comprising using the second set of resources during non-paging time periods.

61. The method of claim 60 comprising temporarily suspending the second communication session, and returning to the first communication session to check a paging channel.

62. A method of wireless data transmission provided by a communications service provider, comprising:
  monitoring, during a communication session, user equipment state;
  deciding whether to transition from a first set of resources including a first subscriber station to a second set of resources including a second subscriber station as a function of at least one of: i) a cost associated with dropping the communication session; or ii) identity of a party to the communication session in communication with a user of the first subscriber station; and
  transitioning the communication session, when it is decided to transition from the first set of resources to the second set of resources, from the first set of resources to the second set of resources, said transitioning including transitioning the communication session from the first subscriber station to the second subscriber station.

63. The method of claim 1, wherein said first subscriber station is a one of: a cellular telephone, a cordless telephone, a Session Initiation Protocol (SIP) phone, a wireless local loop (WLL) station, a personal digital assistant (PDA), and a handheld device having wireless connection capability.

64. The method of claim 63, wherein said second subscriber station is one of: a cellular telephone, a cordless telephone, a Session Initiation Protocol (SIP) phone, a wireless local loop (WLL) station, a personal digital assistant (PDA), and a handheld device having wireless connection capability, said second subscriber station using different communications resources from said first subscriber station.

65. The method of claim 1, wherein one of said first subscriber station is a cellular telephone using a licensed band and said second subscriber station is a home phone using an unlicensed band.

66. The method of claim 1, wherein one of said first and second subscriber stations is a cellular telephone and another one of said subscriber stations is an analog telephone.

67. The method of claim 1, wherein deciding whether to transition from a first set of resources including a first subscriber station to a second set of resources including a second subscriber station is also a function of:
  acoustic noise near the first telephone.

68. The method of claim 67, wherein said acoustic noise includes a dog barking.

* * * * *